United States Patent
Laroia et al.

(10) Patent No.: US 10,110,794 B2
(45) Date of Patent: Oct. 23, 2018

(54) CAMERA DEVICE INCLUDING MULTIPLE OPTICAL CHAINS AND RELATED METHODS

(71) Applicant: THE LIGHTCO INC., Palo Alto, CA (US)

(72) Inventors: Rajiv Laroia, Far Hills, NJ (US); Sapna A. Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 14/795,883

(22) Filed: Jul. 9, 2015

(65) Prior Publication Data

US 2016/0014314 A1    Jan. 14, 2016

Related U.S. Application Data

(60) Provisional application No. 62/022,652, filed on Jul. 9, 2014.

(51) Int. Cl.
*H04N 9/083* (2006.01)
*H04N 3/14* (2006.01)
(Continued)

(52) U.S. Cl.
CPC ......... *H04N 5/2258* (2013.01); *G02B 5/201* (2013.01); *G02B 5/208* (2013.01); *H04N 5/2254* (2013.01);
(Continued)

(58) Field of Classification Search
USPC ........................................ 348/272, 273, 280
See application file for complete search history.

(56) References Cited

U.S. PATENT DOCUMENTS

| 4,890,133 A | 12/1989 | Ogawa et al. |
| 5,078,479 A | 1/1992 | Vuilleumier |

(Continued)

FOREIGN PATENT DOCUMENTS

| EP | 2642757 A2 | 9/2013 |
| JP | 10091765 | 4/1998 |

(Continued)

OTHER PUBLICATIONS

International Search Report and Written Opinion of the International Searching Authority from International Application No. PCT/US15/39832, pp. 1-7, dated Nov. 5, 2015.

(Continued)

*Primary Examiner* — Anthony J Daniels
(74) *Attorney, Agent, or Firm* — Straub & Straub; Michael P. Straub; Stephen T. Straub

(57) ABSTRACT

A camera device includes multiple sensors with each sensor including an integrated multi-element filter. Because of the use of different filters in different sensors, a wide variety of filter patterns can be supported in a single camera device without the need for moveable or otherwise changeable filters. While multiple optical chains and sensors are included which sensors are used during a given time period are determined based on the whether a power save mode of operation is active and/or the image capture mode being used. Fewer optical chains are used during power save mode for capturing images corresponding to the image mode in use, e.g., color, IR, or monochrome. While the camera device may include a large number of optical modules, e.g., 4, 10 or more, in some embodiments sensors of optical chains not selected for use during a given time period are intentionally powered down to conserve power.

14 Claims, 12 Drawing Sheets

500

| EXEMPLARY ALTERNATIVE STANDARD RGB PATTERNS | | |
|---|---|---|
| RGB PATTERN 1 (BAYER) | RGB PATTERN 2 | RGB PATTERN 3 |
| 50% G | 25% G | 25% G |
| 25% R | 50% R | 25% R |
| 25% B | 25% B | 50% B |

(51) Int. Cl.
  *H04N 5/335*   (2011.01)
  *H04N 9/04*    (2006.01)
  *H04N 5/225*   (2006.01)
  *G02B 5/20*    (2006.01)
  *H04N 5/232*   (2006.01)
  *H04N 5/33*    (2006.01)

(52) U.S. Cl.
  CPC ..... *H04N 5/23241* (2013.01); *H04N 5/23245* (2013.01); *H04N 5/332* (2013.01); *H04N 9/045* (2013.01)

(56) References Cited

U.S. PATENT DOCUMENTS

| | | | |
|---|---|---|---|
| 5,153,569 A | 10/1992 | Kawamuraa et al. | |
| 5,353,068 A | 10/1994 | Moriwake | |
| 5,583,602 A | 12/1996 | Yamamoto | |
| 5,781,331 A | 7/1998 | Carr et al. | |
| 5,889,553 A | 3/1999 | Kino et al. | |
| 5,975,710 A | 11/1999 | Luster | |
| 5,982,951 A | 11/1999 | Katayama et al. | |
| 6,011,661 A | 1/2000 | Weng | |
| 6,028,600 A | 2/2000 | Rosin et al. | |
| 6,081,670 A | 6/2000 | Madsen et al. | |
| 6,141,034 A | 10/2000 | McCutchen | |
| 7,009,652 B1 | 3/2006 | Tanida et al. | |
| 7,057,647 B1* | 6/2006 | Monroe | G02B 13/16 348/217.1 |
| 7,280,735 B2 | 10/2007 | Thibault | |
| 7,315,423 B2 | 1/2008 | Sato | |
| 7,551,358 B2 | 6/2009 | Lee et al. | |
| 7,561,201 B2 | 7/2009 | Hong | |
| 7,801,428 B2 | 9/2010 | Nagaishi et al. | |
| 7,810,511 B2 | 10/2010 | Fagrenius et al. | |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura et al. | |
| 8,417,058 B2 | 4/2013 | Tardif | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ahn et al. | |
| 8,665,341 B2 | 3/2014 | Georgiev et al. | |
| 8,704,944 B1 | 4/2014 | Wierzoch et al. | |
| 8,762,895 B2 | 6/2014 | Mehta et al. | |
| 8,780,258 B2 | 7/2014 | Lee | |
| 8,896,655 B2 | 11/2014 | Mauchly et al. | |
| 9,041,826 B2 | 5/2015 | Jung et al. | |
| 9,104,705 B2 | 8/2015 | Fujinaga | |
| 9,135,732 B2 | 9/2015 | Winn et al. | |
| 9,282,228 B2 | 3/2016 | Laroia | |
| 9,374,514 B2 | 6/2016 | Laroia | |
| 2002/0149691 A1 | 10/2002 | Pereira et al. | |
| 2003/0018427 A1 | 1/2003 | Yakota et al. | |
| 2003/0020814 A1 | 1/2003 | Ono | |
| 2003/0185551 A1 | 10/2003 | Chen | |
| 2004/0100479 A1 | 5/2004 | Nakano et al. | |
| 2004/0227839 A1 | 11/2004 | Stavley et al. | |
| 2005/0088546 A1 | 4/2005 | Wang | |
| 2005/0200012 A1 | 9/2005 | Kinsman | |
| 2006/0067672 A1 | 3/2006 | Washisu et al. | |
| 2006/0187338 A1 | 8/2006 | May et al. | |
| 2006/0221218 A1 | 10/2006 | Adler et al. | |
| 2006/0238886 A1 | 10/2006 | Kushida et al. | |
| 2006/0281453 A1 | 12/2006 | Jaiswal et al. | |
| 2007/0050139 A1 | 3/2007 | Sidman | |
| 2007/0065012 A1 | 3/2007 | Yamakado et al. | |
| 2007/0127915 A1 | 6/2007 | Lu et al. | |
| 2007/0177047 A1 | 8/2007 | Goto | |
| 2007/0182528 A1 | 8/2007 | Breed et al. | |
| 2008/0030592 A1 | 2/2008 | Border et al. | |
| 2008/0074755 A1 | 3/2008 | Smith | |
| 2008/0084484 A1 | 4/2008 | Ochi et al. | |
| 2008/0111881 A1 | 5/2008 | Gibbs et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0240698 A1 | 10/2008 | Bartilson et al. | |
| 2008/0247745 A1 | 10/2008 | Nilsson | |
| 2008/0251697 A1 | 10/2008 | Park et al. | |
| 2008/0278610 A1 | 11/2008 | Boettiger | |
| 2009/0086032 A1 | 4/2009 | Li | |
| 2009/0136223 A1 | 5/2009 | Motomura et al. | |
| 2009/0154821 A1 | 6/2009 | Sorek et al. | |
| 2009/0225203 A1 | 9/2009 | Tanida et al. | |
| 2009/0278950 A1 | 11/2009 | Deng et al. | |
| 2009/0290042 A1 | 11/2009 | Shiohara | |
| 2010/0013906 A1 | 1/2010 | Border et al. | |
| 2010/0034531 A1 | 2/2010 | Go | |
| 2010/0045774 A1 | 2/2010 | Len et al. | |
| 2010/0053414 A1 | 3/2010 | Tamaki et al. | |
| 2010/0079635 A1 | 4/2010 | Yano et al. | |
| 2010/0091089 A1 | 4/2010 | Cromwell et al. | |
| 2010/0097443 A1 | 4/2010 | Lablans | |
| 2010/0225755 A1 | 9/2010 | Tamaki et al. | |
| 2010/0238327 A1 | 9/2010 | Griffith et al. | |
| 2010/0265346 A1 | 10/2010 | Iizuka | |
| 2010/0283842 A1 | 11/2010 | Guissin et al. | |
| 2010/0296802 A1 | 11/2010 | Davies | |
| 2011/0051243 A1 | 3/2011 | Su | |
| 2011/0063325 A1 | 3/2011 | Saunders | |
| 2011/0069189 A1 | 3/2011 | Venkataraman et al. | |
| 2011/0080655 A1 | 4/2011 | Mori | |
| 2011/0123115 A1 | 5/2011 | Lee et al. | |
| 2011/0128393 A1 | 6/2011 | Tavi et al. | |
| 2011/0157430 A1 | 6/2011 | Hosoya et al. | |
| 2011/0157451 A1 | 6/2011 | Chang | |
| 2011/0187878 A1 | 8/2011 | Mor et al. | |
| 2011/0193984 A1 | 8/2011 | Kitaya et al. | |
| 2011/0205412 A1* | 8/2011 | Miyazaki | H01L 27/14621 348/294 |
| 2011/0221920 A1 | 9/2011 | Gwak | |
| 2011/0222167 A1 | 9/2011 | Iwasawa | |
| 2011/0242342 A1 | 10/2011 | Goma et al. | |
| 2011/0280565 A1 | 11/2011 | Chapman et al. | |
| 2011/0285895 A1 | 11/2011 | Weng et al. | |
| 2012/0002096 A1 | 1/2012 | Choi et al. | |
| 2012/0033069 A1 | 2/2012 | Becker et al. | |
| 2012/0062691 A1 | 3/2012 | Fowler et al. | |
| 2012/0155848 A1 | 6/2012 | Labowicz et al. | |
| 2012/0162464 A1 | 6/2012 | Kim | |
| 2012/0188391 A1 | 7/2012 | Smith | |
| 2012/0188422 A1* | 7/2012 | Cho | H04N 5/2258 348/280 |
| 2012/0027462 A1 | 8/2012 | Justice | |
| 2012/0242881 A1 | 9/2012 | Suzuki | |
| 2012/0249815 A1 | 10/2012 | Bohn et al. | |
| 2012/0257013 A1 | 10/2012 | Witt et al. | |
| 2012/0257077 A1 | 10/2012 | Suzuki | |
| 2012/0268642 A1 | 10/2012 | Kawai | |
| 2013/0027353 A1 | 1/2013 | Hyun | |
| 2013/0050564 A1 | 2/2013 | Adams, Jr. et al. | |
| 2013/0057743 A1 | 3/2013 | Minagawa et al. | |
| 2013/0064531 A1 | 3/2013 | Pillman et al. | |
| 2013/0076928 A1 | 3/2013 | Olsen et al. | |
| 2013/0086765 A1 | 4/2013 | Chen | |
| 2013/0088614 A1 | 4/2013 | Lee | |
| 2013/0093842 A1* | 4/2013 | Yahata | H04N 5/23238 348/38 |
| 2013/0093886 A1* | 4/2013 | Rothschild | G08G 1/0175 348/148 |
| 2013/0093947 A1 | 4/2013 | Lee et al. | |
| 2013/0100272 A1 | 4/2013 | Price et al. | |
| 2013/0153772 A1 | 6/2013 | Rossi et al. | |
| 2013/0155194 A1 | 6/2013 | Sacre et al. | |
| 2013/0194475 A1 | 8/2013 | Okamoto | |
| 2013/0222676 A1 | 8/2013 | Ono | |
| 2013/0223759 A1 | 8/2013 | Nishiyama | |
| 2013/0250125 A1 | 9/2013 | Garrow et al. | |
| 2013/0258044 A1 | 10/2013 | Betts-Lacroix | |
| 2014/0049677 A1 | 2/2014 | Kawaguchi | |

(56) References Cited

U.S. PATENT DOCUMENTS

| | | |
|---|---|---|
| 2014/0063018 A1 | 3/2014 | Takeshita |
| 2014/0111650 A1* | 4/2014 | Georgiev ............... G06T 3/4038 348/159 |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267021 A1* | 9/2014 | Lee ......................... G06F 3/013 345/156 |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0172608 A1* | 6/2015 | Routhier ............... H04N 5/2258 348/265 |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |
| 2016/0314346 A1* | 10/2016 | Bigioi ................ G06K 9/00261 |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

* cited by examiner

500

| EXEMPLARY ALTERNATIVE STANDARD RGB PATTERNS |||
|---|---|---|
| RGB PATTERN 1 (BAYER) | RGB PATTERN 2 | RGB PATTERN 3 |
| 50% G | 25% G | 25% G |
| 25% R | 50% R | 25% R |
| 25% B | 25% B | 50% B |

| MULTI-OPTICAL CHAIN CAMERA DEVICE ||
|---|---|
| SENSOR # | SENSOR FILTER TYPE |
| 1 | RGB PATTERN 1 (BAYER) |
| 2 | RGB PATTERN 2 |
| 3 | RGB PATTERN 3 |
| 4 | RGB PATTERN 1 |
| 5 | RGB PATTERN 2 |
| 6 | RGB PATTERN 3 |
| 7 | BROADBAND (CLEAR) |
| 8 | RED |
| 9 | BLUE |
| 10 | GREEN |
| 11 | IR |
| 12 | RGCB |
| 13 | RGCB |
| 14 | RGIRB |
| 15 | RGIRB |
| 16 | RCCB |
| 17 | RCCB |

| EXAMPLE SETS OF MODULES USED DURING DIFFERENT MODES OF OPERATION |||
|---|---|---|
| MODE | TYPE OF MODE | SET OF OPTICAL CHAINS (SENSOR) USED |
| 1 | COLOR PREVIEW | 1 (RGGB) OR 12 (RGCB) OR 14 (RGIRB) |
| 2 | IR PREVIEW | 11 (IR) or 14 (RGIRB) |
| 3 | MONO PREVIEW | 7 (C) or 12 (RGCB) |
| 4 | COLOR IMAGE CAPTURE | (1,2,3,4,5,6) OR (12, 13) OR (16,17) OR (1,2,3,4,5,6,12,13,14,15) OR (1,2,3,4,5,6,8,9,10) |
| 5 | IR IMAGE CAPTURE | (11, 14, 15) or (14, 15) OR (11) OR (14) OR (15) |
| 6 | MONO IMAGE CAPTURE | (7) OR (12, 13) OR (16, 17) OR (7, 12,13,16,17) |

FIGURE 9

CAMERA DEVICE INCLUDING MULTIPLE OPTICAL CHAINS AND RELATED METHODS

RELATED APPLICATIONS

The present application claims the benefit of U.S. Provisional Patent Application Ser. No. 62/022,652 filed Jul. 9, 2014 and PCT/US15/39832 filed on Jul. 9, 2015 with the US Receiving office both of which are hereby expressly incorporated by reference in their entirety.

BACKGROUND

The use of camera devices with a single optical chain and sensor tends to limit the amount and type of optical information that can be captured as the result of the limitations of the single sensor and/or a fixed color filter incorporated into or associated with the sensor.

Many sensors include what is know as a Bayer filter. In a Bayer filter, more pixel elements are subject to a green filter while a lesser number of pixel elements are subjected to red and blue filters. This results in the sensor capturing more pixel values corresponding to the color green than the color red or blue. Given that the human eye is more sensitive to the color green, this has been considered a reasonable design choice with respect to many camera implementations.

Unfortunately, the capture of more green pixel values then red and blue pixel values results in a non-uniform amount of information being captured by the camera with respect to the three colors, Red (R), Green (G) and Blue (B) often captured as the basis of color images.

In addition, the use of conventional sensors with Bayer filters limits the information which can be captured by a sensor to R, G and B information since the filter over a pixel element will normally filter out light other than the R, G or B color to which the filter element over a pixel of a sensor corresponds.

While R, G and B light information is normally sufficient for normal photographs, it is sometimes desirable to capture broadband information such as that which can be captured without using a color filter over a pixel element of a sensor and in some cases it is desirable to capture IR information rather than R, G, B information, e.g., at night.

While using movable filters with the filters being changeable might seem like one approach to avoid being limited to the standard Bayer filter pattern, when the filters are to be aligned with individual pixel elements of a sensor such alignment can be difficult to achieve if a movable filter arrangement were attempted.

While a uniform filter may be placed over a sensor, e.g., to allow the sensor to detect light of a single color, such an approach requires different sensors for each color if a color image is to be captured and/or requires images to be captured at different times with the filter being changed between image capture periods.

In view of the above discussion it should be appreciated that there is a need for methods and apparatus which would allow a camera device to capture images without being constrained to using a single filter configuration or using separate sensor for each individual color. Furthermore, it would be desirable if the camera device did not require the use of movable filters for at least some applications with the camera device being able to capture different colors of light using an individual sensor in at least some applications.

BRIEF DESCRIPTION OF THE FIGURES

FIG. 5 illustrates characteristics of three exemplary alternative RGB filter patterns.

FIG. 8B is a list of sensors in the exemplary camera device of FIG. 8A with the different filter patterns integrated into the individual sensors being indicated.

FIG. 9 illustrates various modes of operation that can be supported by the exemplary camera device of FIGS. 8A and 8B along with sets of optical chains that may be selected to capture images for the indicated modes of operation.

SUMMARY

Figure 1:
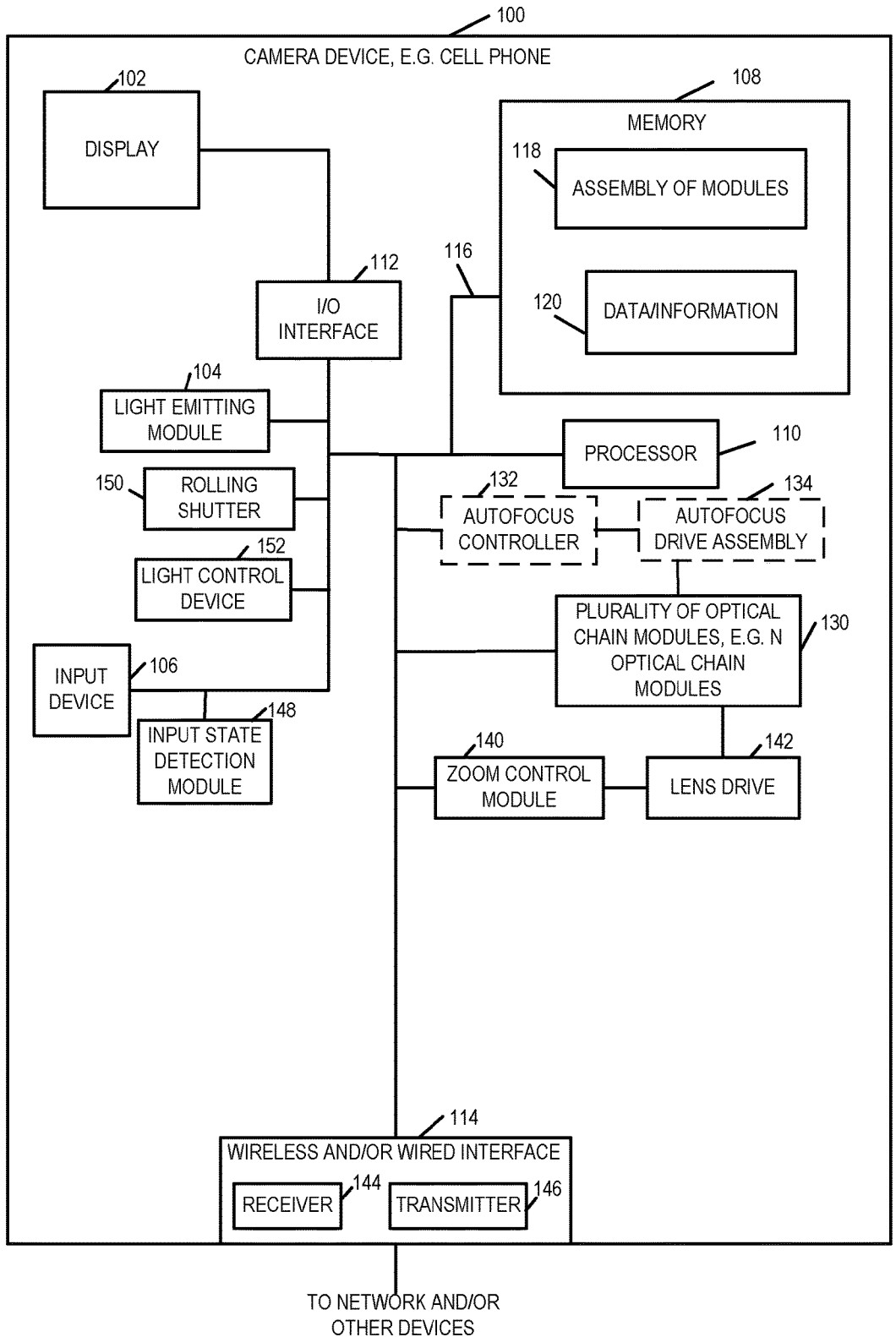
FIG. 1 illustrates an exemplary camera device implemented in accordance with various exemplary embodiments.

Camera device methods and apparatus are described. In at least some embodiments a camera device, e.g., a stand alone camera or cell phone, includes a plurality of optical chains, e.g., camera modules, which employ different multiple element filter patterns used to filter light reaching the pixel element of the sensor. In many but not necessarily all embodiments, the filters are integrated into the sensor included in an optical chain.

Thus, in at least some embodiments, a camera device includes multiple sensors with each sensor including an integrated multi-element filter. Because of the use of different filters in different sensors, a wide variety of filter patterns can be supported in a single camera device without the need for moveable or otherwise changeable filters. Filter patterns used in some embodiments include the Bayer filter pattern, which includes two G (green) filter elements, one R (red) filter element and one B (blue) filter element, for each set of four pixel sensors. Such a pattern is sometimes expressed as a R, G, G, B pattern. While one or more sensors of a camera device may and sometimes do include a filter with a Bayer pattern, sensors of other optical chains of the same camera device include other filter patterns. One or more of the filter patterns that may and sometimes are used include an R, G, C (clear), B pattern, where for every four pixels of the sensor one is covered with an R filter, one is covered with a G filter, one is covered with a C filter and one is covered with a B filter. Because the C filter passes a broad range of wavelengths corresponding to different colors it is sometimes referred to as a broadband filter. Another filter pattern that is used in some sensors is an R, G, IR, B filter. In such a sensor, IR light will be detected and measured by one of every four pixel elements of the sensor with R, B and G light being measured by the other pixel elements of the sensor in the set of four pixel elements. Another filter pattern which may, and sometimes is, used is an R, C, C, B filter pattern. In such an embodiment, G light levels may be and sometimes are determined by subtracting the sum of R and B light levels from a light level measured using one or more of the C filter elements.

In some embodiments different color filter arrangements are used for different sensors. In some embodiments rather than use the traditional Bayer pattern in each of the sensors with R, G and B filter elements, at least one sensor includes a filter with an R, G, G, B pattern, another sensor has a R, B, B, G pattern and another sensor has an G, R, R, B pattern. By using a plurality of sensors with different patterns a more balanced overall color image capture may be achieved than if all sensors incorporated the standard R, G, G, B pattern. In fact, in some embodiments for a given color a combination of sensors may, on average, capture in total the same number or approximately the same number of pixels of each color. While such a balanced color capture may be achieved in some embodiments by using sensors with different filter patterns where each set of four pixel filter elements include two filter elements corresponding to a single color, a similar average color capture may be achieved by avoiding the duplicative color element in the filter arrangement and using in its place an IR filter or a clear filter.

While in various embodiments a camera device includes multiple optical chains, e.g., camera modules, with different optical chains including different sensors with different integrated multi-pixel element filters, images can be, and sometimes are, generated from pixel values captured by one or more sensors at a given time.

Which set of sensors, and thus set filter patterns, is used at a particular point in time is determined, in some embodiments, based on the camera device's mode of operation. The mode of operation can be user determined, e.g., based on a user setting, or automatically determined based on detected conditions, e.g., light conditions. In some embodiments camera modules whose output will not be used during a given mode of operation are powered down thus conserving battery power and avoiding heat issues associated with operating camera modules whose output will not be used during a given time period and processing the images captured by such modules.

In other embodiments multiple camera modules are operated in parallel and the captured images are stored with the image data which is used and combined to form final images being determined as part of a post image capture operation, e.g., performed in the camera or by an image processing device which receives the images, e.g., pixel values, captured by the sensor of the optical chains included in the camera device.

In some embodiments during a preview mode of operation an image is generated and displayed from a single camera module including a sensor with a filter with R, G and B filter elements. The filter may be, and sometimes is a standard Bayer filter with an R, G, G, B pattern, but in other embodiments the filter of the sensor used for preview mode includes an R, G, IR, B filter or an R, G, C, B filter.

In the embodiment where an R, G, IR, B filter pattern is used for the sensor of the camera module which is processed to generate a preview image, the use of the R, G, IR, B filter allows for color or IR images to be generated and displayed based on the output of a single sensor. This allows a user to select between a color or IR image capture mode and see a preview image without the need for the camera to processes, as part of the preview operation, image output from more than optical chain and the sensor included therein.

In the embodiment where an R, G, C, B filter pattern is used for the sensor of the camera module which is processed to generate a preview image, the use of the R, G, C, B filter allows for color or mono images to be generated and displayed based on the output of a single sensor with the output of the R, G, B pixel elements being used to produce the color preview image in some embodiments and the output of the C pixel elements to produce the monochrome preview image in some embodiments. This allows a user to select between a color or black and white image capture preview mode and see a preview image without the need for the camera to process, as part of the preview operation, image output from more than one optical chain and the sensor included therein.

In some embodiments the camera device includes at least one sensor with at least one C filter element in addition to one or more color filter elements, e.g. an R, G, B, filter elements or an R, B, C, C filter element and another optical chain with an integrated filter including an R, G, B and IR filter element. The camera device selects between which single one of the multiple sensors to use for generating a preview image based on whether the user selects a color preview image, black and white preview image or IR preview image. Thus, a preview image can be generated from the output of a single sensor, e.g., with the sensor with the C filter elements providing pixel values for a black and white preview and the sensor with the IR filter elements being used in the case where an IR preview image is selected and one of the sensors with at least R, G, B filter elements integrated into the sensor being used for the preview in the case of a color preview image. While not necessary in all embodiments, in some embodiments the choice of which sensor to select from for preview purposes is made from fewer sensors than preview modes which are supported. For example, in one mode where a color, black and white and IR preview mode is supported, the choice of which single sensor to use for providing pixel values for generating a preview image is made between a first sensor with an R, G, IR, B filter and second sensor with an R, G, C, B filter or R, C, C, B filter. In some cases when the black and white or IR preview mode is selected, the R, G, B pixel values are not used to generate the preview image but rather only the pixel values corresponding to the C or IR filters depending on whether black and while or an IR preview image was selected.

By including a number of optical chains with sensors that include different filter patterns, the set of optical chains and thus filter patterns used at a given time can be selected to match the type of image to be generated.

In various embodiments different optical chains use sensors corresponding to different filter patterns, e.g. filter patterns which may include C, R, G, B, and/IR filter elements on a per pixel basis with each element corresponding to an area used to detect one pixel value. The filters are included as a layer of the sensor thereby resulting in pixel level alignment between the filter element and the corresponding portion of the sensor which measures a pixel value from the light which passes through the filter and reaches the detector portion of the sensor. Sensors of different optical chains are, in at least some embodiments, implemented on different chips and thus on different semi-conductors with each sensor being an independent device in some embodiments capable of being powered on/or off depending on which sensors are to be used during a given time period. By implementing the sensors on different semiconductors, the sensors can be independently controlled and powered off fully or partially as part of a power down operation. Thus, the use of independent sensors on separate chips facilitates, in some embodiments, power control allowing the camera device under control of a processor to select which optical chain or chains to be used at a given time and to power off the sensor and/or other components of an optical chain which is not being used during an image capture time period. This approach means that power consumption does not scale linearly with the number of optical chains and/or sensors and a wide variety of optical chains can be included in a camera device without having to be concerned with the power consumption that might be required to power the full set of optical chains during all image capture time periods.

While powering down of some sensors is used in some embodiments, various methods and sensor combinations described herein without the power control features described with respect to some embodiments. Similarly, the power control features do not depend on a particular combination of sensors or filter patterns and can be used with a wide variety of optical chain configurations.

During some image capture operations some or the majority of sensors may be powered off with only the sensor's whose output will be used being powered on and operated in parallel. This allows for efficient use of power, processing and energy (e.g., battery power) in a handheld portable camera device implemented in accordance with the invention. For example in a preview mode of operation a single optical chain having a sensor of the type which will be used during a subsequent image capture time period may be powered on with the remaining optical chains being powered down.

Images may be generated by combining the pixel values captured by sensors or different optical chains in the camera or externally as part of a post image capture processing operation, e.g., in a image processing device such as a computer located in a customer's home or in a network, e.g., as may be the case in a cloud based image processing approach.

In some embodiments a camera device includes multiple camera modules, e.g., 4, 10, 16 or even more with at least some of the camera modules, e.g., optical chains, including sensors with different filters integrated into the sensors and with at least some of the sensors including 3 or four different types of pixel level filters with each pixel element of the sensor being covered by a filter of a single type, e.g., a R, G, B, C or IR filter depending on the particular embodiment with one or more of the sensors being used at a given time depending on the mode of operation Numerous features, benefits and embodiments are possible and discussed in the detailed description which follows.

DETAILED DESCRIPTION

FIG. 1 illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, a rolling shutter 150, a light control device 152, memory 108, a processor 110, a wireless and/or wired interface 114, e.g., a cellular interface, a WIFI interface, or a USB interface, an I/O interface 112, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. In some embodiments the input device 106 includes at least one zoom control button that can be used to enable or disable camera zoom functionality. In some such embodiments when the zoom control button is in a depressed state the camera zoom function is enabled while when the button is in a undepressed state the camera zoom function is disabled. The input state detection module 148 is configured to detect the state of the input device, e.g., the zoom control button, to detect whether the button is in a depressed state or undepressed state. In some embodiments there is status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, the wireless and/or wired interface 114, a zoom control module 140, and a plurality of optical chain modules 130, e.g., N optical chain modules. Each optical chain module includes a sensor. In various embodiments, a sensor includes a filter, e.g., a RGB filter. In at least some embodiments, some different optical chains modules includes different filters, e.g., different RGB filters. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are uses as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation.

The rolling shutter 150 is an electronic shutter that controls reading out of different portions of an image sensor at different times. While an electronic rolling shutter is used in most of the embodiments, a mechanical rolling shutter may still be used in some embodiments.

The light control device 152 is configured to control light emitting elements (e.g., included in the LED module 104) in a synchronized manner with the operation of the rolling shutter 150. In some embodiments the light control device 152 is configured to control different sets of light emitting elements in the array to emit light at different times in a manner that is synchronized with the timing of the rolling shutter 150.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. In some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The zoom control module 140 is configured to perform a zoom operation. In some embodiments the zoom control module serves as a focal length determination module to determine the focal length from a user setting, e.g., a focal length set by a user of the camera via a zoom control input. A change in zoom in some embodiments is achieved by moving one or more lenses outward towards the front of the camera to increase the zoom and towards the back of the camera to decrease the zoom and allow a larger image area to be captured. In other embodiments a change in one or more lenses is used to implement a zoom operation. While various methods and apparatus for implementing a zoom change have been described, the zoom control interface described herein can be used with a wide range of zoom mechanisms and is not limited to implementing a zoom operation in a particular way.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Figure 2:
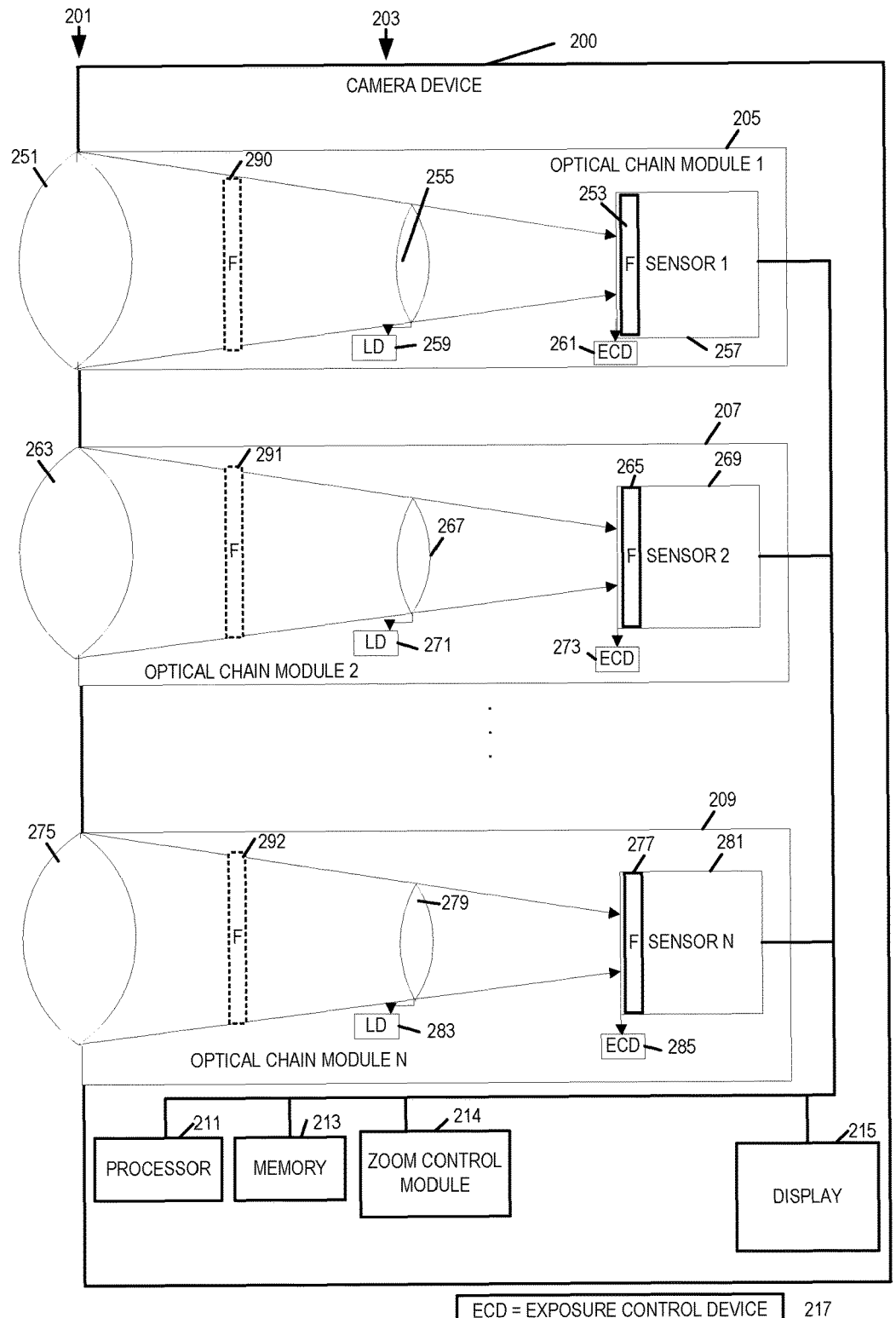
FIG. 2 illustrates an exemplary camera device implemented in accordance with various exemplary embodiments.

FIG. 2 illustrates a camera device 200 implemented in accordance with the invention. The FIG. 2 camera device 200 includes many or all of the same elements shown in the device 100 of FIG. 1. Exemplary camera device 200 includes a plurality of optical chain modules (OCM 1 205, OCM 2 207, . . . , OCM N 209), a processor 211, memory 213 and a display 215, coupled together. OCM 1 205 includes outer lens L1 251, inner lens L2 255, sensor 1 257 including a filter 253, lens drive (LD) 259 and exposure control device (ECD) 261. In some embodiments, processor 211 of camera device 200 of FIG. 2 is the same as processor 110 of device 100 of FIG. 1, memory 213 of device 200 of FIG. 2 is the same as memory 108 of device 100 of FIG. 1, the zoom control module 214 of device 200 is the same as zoom control module 140 of device 100, and display 215 of device 200 of FIG. 2 is the same as display 102 of device 100 of FIG. 1.

OCM 2 207 includes outer lens L1 263, inner lens L2 267, sensor 2 269 including filter 265, LD 271 and ECD 273. OCM N 209 includes outer lens L1 275, inner lens L2 279, sensor N 281 including filter 277, LD 283 and ECD 285. Box 217, which represents a key, indicates that ECD=exposure control device and LD=lens drive.

In various embodiments, at least some of the filters (253, 265, . . . , 277) are different, e.g., are different RGB filters.

In the FIG. 2 embodiment the optical chain modules (optical chain module 1 205, optical chain module 2 207, . . . , optical chain module N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In some embodiments, one or more or all of the optical chain modules (205, 207, . . . , 209) includes a filter (290, 291, . . . , 292), which is external to the sensor (257, 269, . . . , 281), respectively.

Figure 3:
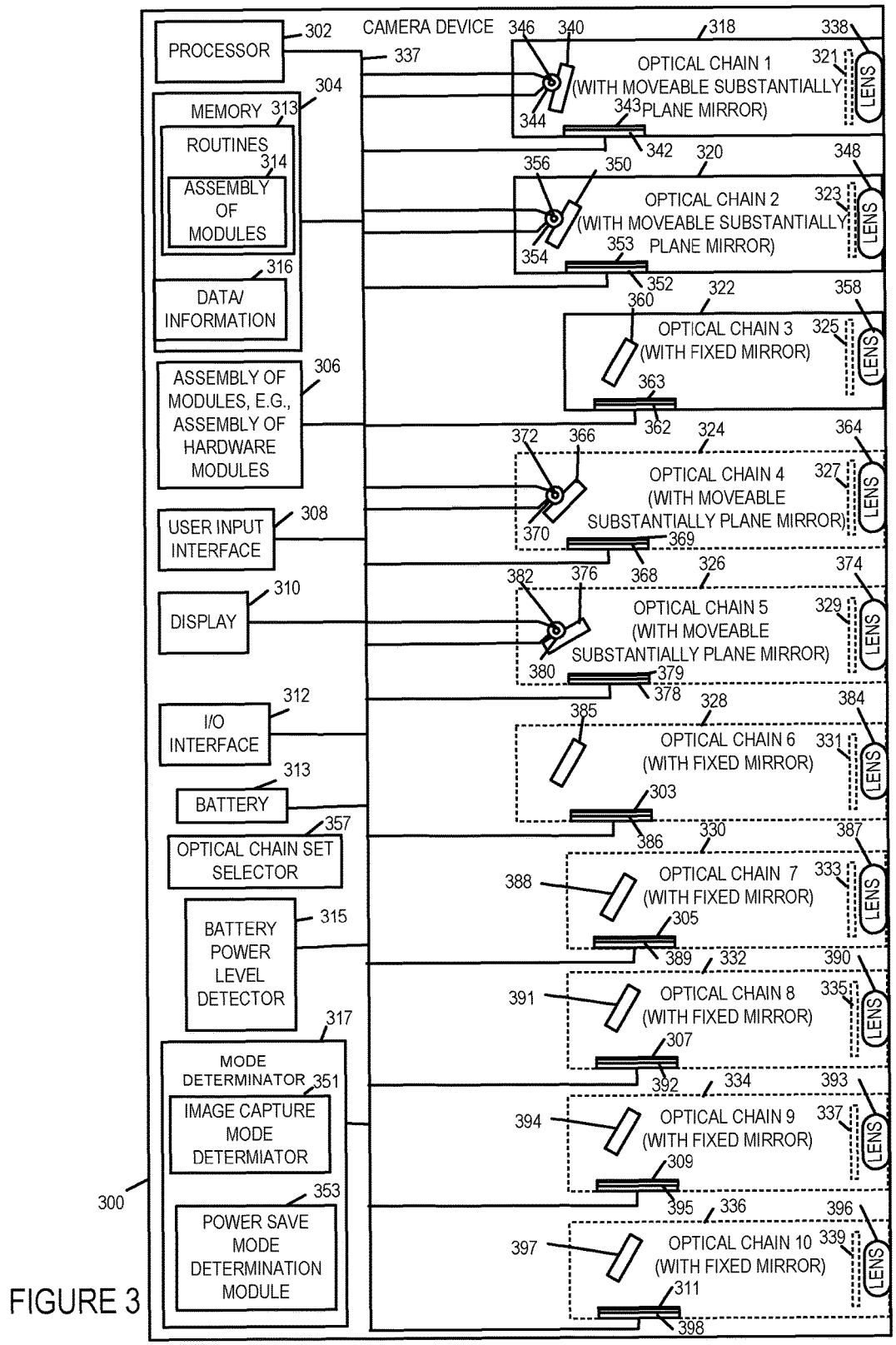
FIG. 3 is a drawing of an exemplary camera device in accordance with various exemplary embodiments.

FIG. 3 is a drawing of an exemplary camera device 300 in accordance with various exemplary embodiments. Camera device 300 includes a processor 302, e.g., a CPU, memory 304, an assembly of modules 306, e.g., an assembly of hardware modules such as circuits, a user input interface 308, a display 310, an I/O interface 312, and a plurality of optical chains (optical chain 1 318, optical chain 2 320, optical chain 3 322, optical chain 4 324, optical chain 5 326, optical chain 6 328, optical chain 7 330, optical chain 8 332, optical chain 9 334, optical chain 10 336), a battery 313, a battery power level detector 315, a optical chain set selector 357, a mode determinator 317 coupled together via a bus 337 over which the various elements may interchange data and information. The battery power level detector 315 measures battery voltage and estimates the amount of power remaining. This information is supplied other mode determinator 317 which also receives user in put, e.g., indicating whether the user has selected to operate the device in a power save mode that affects optical chain selection and/or indicating an image capture mode to be used, e.g., color image capture, IR image capture, monochrome image capture during normal image and/or video capture. The mode determinator 317 may also receive user input indicating whether the user has signaled a preview mode of image capture to be implemented, e.g., prior to the normal mode of image capture. The mode determinator 317 includes an image capture mode determinator 351 which determines from user input the image capture mode of operation to be implemented during a given time period. The mode determinator 317 also includes a power save mode determinator 353 which determines based on user input and/or a detected battery level whether the camera device 300 is to operate in a normal mode of operation or a power save mode of operation. Power save mode can be directly enabled/disabled by user input or triggered automatically based on battery power falling between a level used to trigger power save mode operation.

The determined mode information determined by mode determinator 317 is supplied to the optical chain set selector 357. Thus, optical chain set selector 357 knows whether the camera device is operating in a power save or normal mode of operation and also whether an optical chain set is to be selected for a normal image capture time period or a preview image capture time period. In some embodiments the optical chain set selector 357 selects a single optical chain when the device is to operate in a preview mode of operation with the particular optical chain being selected based on the type of normal image capture mode of operation which the user has selected. For example if the user selected a color (RGB) normal mode of operation and the optical chain set selector was selecting for a preview mode corresponding to such a normal mode, the set sector would select a single optical chain which captures color images for operation during the preview mode. For the normal color mode of operation the selected set of optical chains would depend on the image capture mode as well as whether power save mode is determined to on or not. When power save mode is determined to be on, the optical chain set selector selects a smaller set of optical chains to be used for normal image capture then when power save mode is not on. For example when power save mode is on, the optical chain set selector may select a set of optical chains to be used for image capture having half or less of the number in a set of optical chains which are selected when power save mode is not one.

Figure 8A:
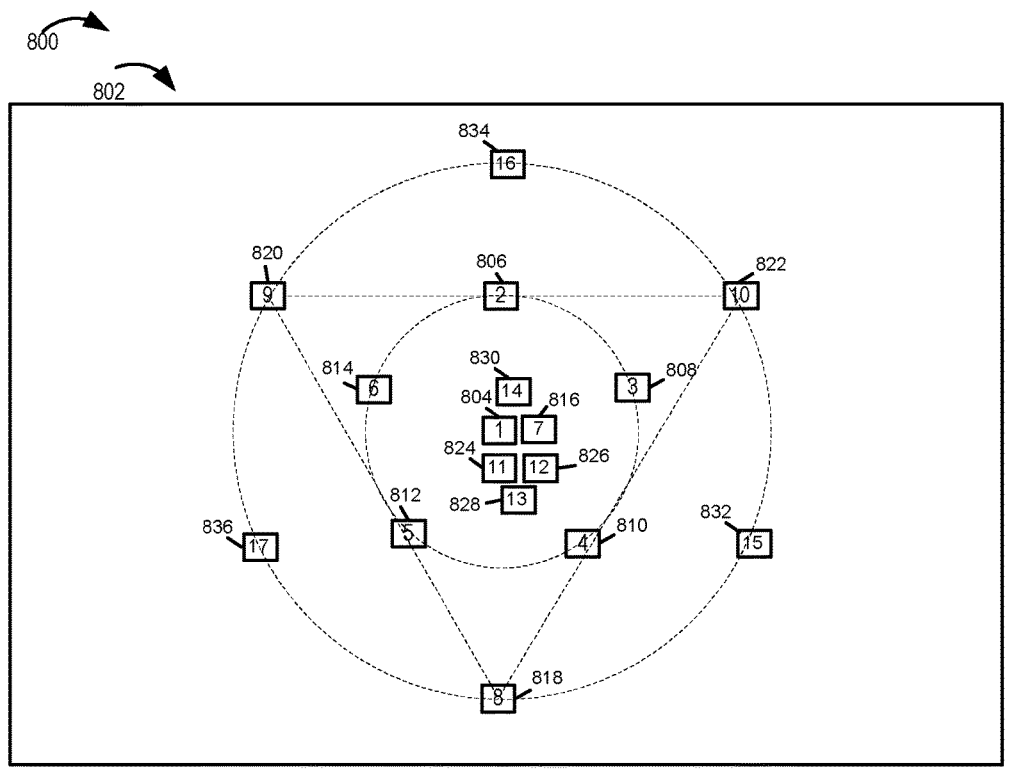
FIG. 8A includes an exemplary front view of a camera device that includes multiple optical chains each of which includes a sensor.

Consider for example FIG. 9 which shows various sets of optical chains realting to the FIGS. 8A and 8B example which may be selected and thus used for different modes of operation. The camera device 300 may be used as the camera device of FIG. 8A and include the optical chain modules listed in FIG. 8B. In the FIG. 9 example in the case of IR preview mode a single optical chain module 11 or 14 will be selected by the optical chain set selector 357 for purposes of image capture during the IR preview mode (Mode 2). For the normal IR image capture mode (Mode 5) a set of optical chains including a single IR capable optical chain 11 or 12 will be used if power save mode is enabled while the set of optical chains including (11, 14, 15) or (14, 15) will be selected if the power save mode is not active and normal power consumption is permitted.

Similarly with regard to normal color image capture mode (Mode 4) if power saving is active at the time the set selection is made, a small set including two optical chain modules will be selected in some embodiments, e.g., set (1), set (12, 13) or set 16, 17) will be selected. However if power save mode is not on, a larger set of optical chain modules will be selected for normal image capture with many more optical chains being used in parallel. For example if power save mode is not on and the set of optical chains is being selected for normal color image capture mode one of the sets of optical chains (1, 2, 3, 4, 5, 6) or (1, 2, 3, 4, 5, 6, 12, 13, 14, 15) or (1, 2, 3, 4, 5, 6, 8, 8, 10) will be selected.

Memory 304 may and in some embodiments does include as part of data/information 316 a table of set selection information mapping modes of operation to sets of optical chains to be used. The data/information can and also sometimes does store information e.g., a one bit flag, indicating whether the user has set power save mode to be enabled or disabled. The power save mode and information described herein can be separate from or part of an overall set of power control information. For example, the power save enable indicator may be separate for a WIFI or other wireless signal enable/disable indicator which may also be set of conserve power. Thus in some embodiments a user can set a power save feature relating to the number of camera modules to be used which is independent of other power settings in some but not necessarily all embodiments.

Thus, in at least some embodiments the camera device of FIGS. 1, 3 and 8 includes a mode determinator 317 configured to determine determining if the camera device is operating in a power save mode of operation or a normal mode of operation and an optical chain set selector 357 configured to select a first set of optical chain, e.g., camera modules, based on an image capture mode of operation to be used to capture images when it is determined that said camera device is operating in the power save mode of operation and a second set of optical chains based on the image capture mode of operation to be used to capture images when it is determined that said camera device is operating in a normal mode of operation, said first set of optical chain modules including fewer optical chain modules than said second set. In some embodiments the image capture mode of operation is one of a color image capture mode of operation, an IR image capture mode of operation, or a monochrome image capture mode of operation. In some embodiments the first set of optical chains, e.g., selected during a power conserve mode of operation, includes half or fewer optical chains than said second set of optical chains, with in some cases the first set of optical chains including a single optical chain and said second set of optical chains includes at least four optical chains but in many cases six or more optical chains.

In some embodiments a user can select between different power save levels of operation with the number of optical chains decreasing as the user setting indicates a higher level power save mode of operation which is to save more power than a lower power save mode of operation. For example in the case of normal operation six or more optical chains may be used in parallel. For a mid level power save mode of operation the sets of optical chains many be limited to four or less. For the highest power save level the optical chain set selector 357 may limit each image capture time period to using a set of optical chains including a single optical chain. Numerous variations are possible. In some embodiments the camera device automatically adjusts the power save level being used based on the determined battery power level with the number of optical chains permitted to be used at the same time being automatically decreased as battery power level decreases when the power save mode has been activated, e.g., automatically based on battery power level dropping below a threshold or by a user setting the power save mode to be on.

While FIG. 3 shows optical chains with mirrors, in many embodiments the optical chains do not include mirrors and the power save features are in no way constrained to embodiments of optical chains of the type shown in FIG. 3.

In some embodiments, optical chain 4 324, optical chain 5 326, optical chain 6 328, optical chain 7 330, optical chain 8 332, optical chain 9 334, and optical chain 10 336 are optional. Display 310, e.g., a liquid crystal display (LCD), a light emitting diode (LED) display, an organic light emitting diode (OLED) display or an active matrix organic light emitting diode (AMOLED) display, is for displaying images, image portions, user menus, etc., to the user of camera 300. User input interface 308 includes, e.g., switches, buttons, touch screen interface, etc. for receiving input from the user. Received user input includes input indicating a user controlled zoom in or a user controlled zoom out. I/O interface 312 includes a plurality of communications ports for communicating with other devices, e.g., a personal computer. I/O interface 312 in some embodiments, includes one or more wireless communications interfaces. Information communicated over I/O interface 312 includes, e.g., combined images generated from captured images from multiple optical chains, and/or captured images from individual optical chains to be processed and/or combined externally, e.g., in a personal computer.

Memory 304 includes routines 313, which includes assembly of modules 314, and data/information 316. Data/information 316, in some embodiments, includes stored information used to determine a light redirection device position of an optical chain including moveable light redirection as a function of user zoom in and or user zoom out information, e.g. scale factors and/or calibration information, for multiple optical chains with moveable light redirection devices. Data information 316, in some embodiments, further includes stored information used to determine an amount of cropping to be performed on an image captured from an optical chain corresponding to zoom setting, e.g., for one or more optical chains in which light redirection devices are not moved as a function of zoom setting.

Optical chain 1 318 includes a lens 338, e.g., an outer lens, a moveable substantially plane mirror 340, and an image sensor 342. In some embodiments, the substantially plane mirror is a plane mirror. In various embodiments, the moveable mirror 340 includes a hinge mount. Optical chain 1 318 further includes a mirror movement module 344, e.g., a drive motor and corresponding drive circuitry, and a mirror position detection module 346, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 342 is used to capture a an image. Image sensor 342 includes a filter 343, e.g., an RGB filter.

Optical chain 2 320 includes a lens 348, e.g., an outer lens, a moveable substantially plane mirror 350, and an image sensor 352. In some embodiments, the substantially plane mirror is a plane mirror. In various embodiments, the moveable mirror 350 includes a hinge mount. Optical chain 2 320 further includes a mirror movement module 354, e.g., a drive motor and corresponding drive circuitry, and a mirror position detection module 356, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 352 is used to capture a an image. Image sensor 352 includes a filter 353, e.g., an RGB filter.

Optical chain 3 322 includes a lens 358, e.g., an outer lens, a fixed mirror 360, e.g., a substantially plane fixed mirror, and an image sensor 362. In some embodiments, the substantially plane fixed mirror is a fixed plane mirror. Image sensor 362 is used to capture a image. Image sensor 362 includes a filter 363, e.g., an RGB filter.

Optical chain 4 324 includes a lens 364, e.g., an outer lens, a moveable substantially plane mirror 366, and an image sensor 368. In some embodiments, the substantially plane mirror is a plane mirror. In various embodiments, the moveable mirror 366 includes a hinge mount. Optical chain 4 324 further includes a mirror movement module 370, e.g., a drive motor and corresponding drive circuitry, and a mirror position detection module 372, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 368 is used to capture an image. Image sensor 368 includes a filter 369, e.g., an RGB filter.

Optical chain 5 326 includes a lens 374, e.g., an outer lens, a moveable substantially plane mirror 376, and an image sensor 378. In some embodiments, the substantially plane mirror is a plane mirror. In various embodiments, the moveable mirror 378 includes a hinge mount. Optical chain 5 326 further includes a mirror movement module 380, e.g., a drive motor and corresponding drive circuitry, and a mirror position detection module 382, e.g., an angular position sensing device such as a resolver or synchro or optical rotary encoder or a magnetic rotary encoder, and, in some embodiments, circuitry to convert the sensor measurement into a digital value, e.g., an analog to digital converter. Image sensor 378 is used to capture a an image. Image sensor 378 includes a filter 379, e.g., an RGB filter.

Optical chain 6 328 includes a lens 384, e.g., an outer lens, a fixed mirror 385, e.g., a substantially plane fixed mirror, and an image sensor 386. In some embodiments, the substantially plane fixed mirror is a fixed plane mirror. Image sensor 386 is used to capture a image. Image sensor 386 includes a filter 303, e.g., an RGB filter.

Optical chain 7 330 includes a lens 387, e.g., an outer lens, a fixed mirror 388, e.g., a substantially plane fixed mirror, and an image sensor 389. In some embodiments, the substantially plane fixed mirror is a fixed plane mirror. Image sensor 389 is used to capture a image. Image sensor 389 includes a filter 305, e.g., an RGB filter.

Optical chain 8 332 includes a lens 390, e.g., an outer lens, a fixed mirror 391, e.g., a substantially plane fixed mirror, and an image sensor 392. In some embodiments, the substantially plane fixed mirror is a fixed plane mirror. Image sensor 392 is used to capture a image. Image sensor 392 includes a filter 307, e.g., an RGB filter.

Optical chain 9 334 includes a lens 393, e.g., an outer lens, a fixed mirror 394, e.g., a substantially plane fixed mirror, and an image sensor 395. In some embodiments, the substantially plane fixed mirror is a fixed plane mirror. Image sensor 395 is used to capture a image. Image sensor 395 includes a filter 309, e.g., an RGB filter.

Optical chain 10 336 includes a lens 396, e.g., an outer lens, a fixed mirror 397, e.g., a substantially plane fixed mirror, and an image sensor 398. In some embodiments, the substantially plane fixed mirror is a fixed plane mirror. Image sensor 398 is used to capture a image. Image sensor 398 includes a filter 311, e.g., an RGB filter.

In various embodiments, at least some of filters (343, 353, 369, 379, 303, 305, 307, 309, 311) are different, e.g. different RGB filters. In some embodiments, one or more or all of the optical chains (318, 320, 322, 324, 326, 328, 330, 332, 334, 336) includes a filter (321, 323, 325, 327, 329, 331, 333, 335, 337, 339), which is external to the sensor (342, 352, 362, 368, 378, 386, 389, 392, 395, 398), respectively.

In one exemplary embodiment optical chain 1 318, optical chain 2 320, optical chain 4 324, optical chain 5 326 and optical chain 6 328 have a focal length=f1; optical chain 3 322, optical chain 7 330, optical chain 8 332, optical chain 9 334 and optical chain 10 336 have a focal length=f2; and f1>f2.

In various embodiments a plurality of optical chains, each including a sensor, are included in a camera device and used to capture images. The images may then be used individually or combined to generate a composite image. The camera of FIG. 2 is exemplary of one such embodiment. While in the FIG. 2 embodiment the sensors 253, 269, 281 are shown as having filters 253, 265, and 267, respectively, placed over the sensors, some sensors maybe and in various embodiments are included without multicolor filters, without any filters at all, or with other types of filters such as IR filters.

In various embodiments, color filtering is applied to the pixel elements of the sensors of one or more different optical chains but not necessarily all optical chains. In such embodiments the sensors of at least some optical chains are used to capture multiple colors, e.g., Red, Green and Blue. Some of the optical chains with sensors that capture multiple colors use what is commonly referred to as a Bayer filter pattern to filter the light before it reaches the individual pixel elements of the sensor. The Bayer filter pattern includes more filters corresponding to the color green (G) then it includes corresponding to Red (R) or Blue (B). Normally, a Bayer filter pattern includes twice as many filter elements corresponding to G than R or B. An exemplary Bayer filter pattern is shown in drawing 402 of FIG. 4A. The Bayer filter pattern collects more light information for Green, e.g., more pixel values, taking into consideration the fact that the human eye is more sensitive to the color green then red or blue. Unfortunately, the use of more pixel elements for green than red or blue results in the amount of image information available for red and blue being less than for green when the Bayer filter pattern is used.

Figure 4A:
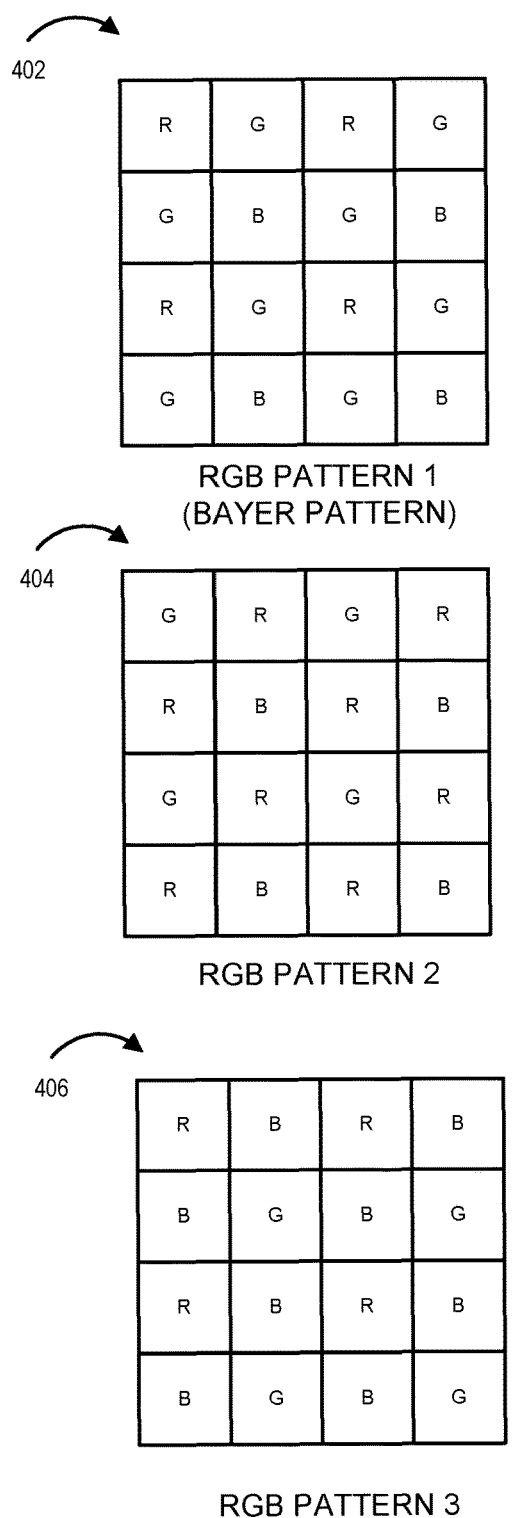
FIG. 4A illustrates three exemplary color filter patterns that may be in various embodiments.

In various embodiments, while the Bayer pattern is used for some optical chains, other filter patterns are used for the sensors of other optical chains of the same camera device. Thus, while some optical chains, e.g., optical chains which include a Bayer filter in front of the pixel elements of the sensor, capture more information e.g., pixel values, corresponding to the color green, other optical chains of the same camera device use multicolor filters which use other patterns, e.g., RGB patterns which are used to capture more R or B pixel values than G pixel values. Drawing 404 and drawing 406 of FIG. 4A illustrates alternative RGB patterns. By using multiple optical chains, e.g., in parallel, with different multicolor filter patterns, images can be captured with different levels of R, G and B information. By combining images with different numbers e.g., some with more R, G or B pixel values than images captured by other optical chains, a more balanced amount of R, G and B information can be obtained and incorporated into a composite image than would be possible if all the optical chains used to capture multiple colors used the same color filter pattern, e.g., Bayer filter pattern.

Figure 4B:
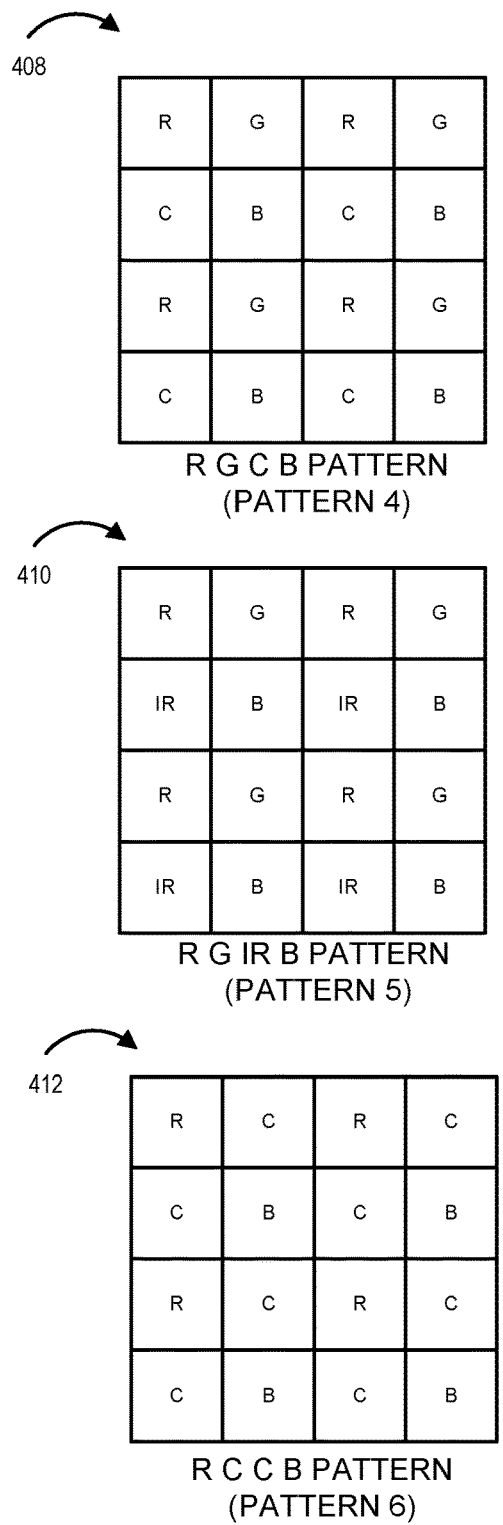
FIG. 4B illustrates three additional exemplary filter patterns that may be used in various embodiments.

Drawing 408 of FIG. 4B illustrates an exemplary alternative filter pattern including red (R), green (G), blue (B), and clear (C) elements, which may be used in some embodiments. Each filter element corresponds to a sensor portion which generates a single pixel value. Drawing 410 of FIG. 4B illustrates an exemplary alternative filter pattern including red (R), green (G), blue (B), and infra-red (IR) elements, which may be used in some embodiments with each element corresponding to a single pixel value for the corresponding color or IR band. Drawing 412 of FIG. 4B illustrates an exemplary alternative filter pattern including red (R), blue (B), and clear (C) elements, which may be used in some embodiments. In the case of an R, B and C embodiment, green values may be and sometimes are computed from the measured C pixel value taking into consideration the measured R and B values with a G pixel value being compute from the C, R and B values.

In various embodiments different optical chains use sensors corresponding to different color filter patterns where the patterns may include one element per pixel. The filters are included as a layer of the sensor thereby resulting in pixel level alignment between the filter element and the corresponding portion of the sensor which measure a pixel value from the light which passes through the filter and reaches the detector portion of the sensor. Sensors of different optical chains are, in at least some embodiments, implemented on different chips and thus on different semi-conductors with each sensor being an independent device in some embodiments capable of being powered on/or depending on which sensors are to be used during a given time period.

Drawing 500 of FIG. 5 illustrates characteristics of three exemplary alternative RGB filter patterns. In some embodiments the filters are incorporated into the sensors. While in other embodiments the filters are placed over the sensors an not incorporated directly into the sensor. While some optical chains use sensors with color filters, other optical chains may avoid the use of filters altogether. In other embodiments one or more of the optical chains may include IR or other filters. By using various types of filter patterns and/or filters in different optical chains operating in parallel, a large amount of information about an image can be captured and used in generating a composite image of a scene area observed by the multiple optical chains.

Numerous various and combinations of optical chains and filter configurations are possible.

In some embodiments optical chains do not use or include mirrors. In some embodiments the optical chains use sensors having the same number of pixels. The optical chains may have the same or different focal lengths depending on the embodiment.

Figure 6:
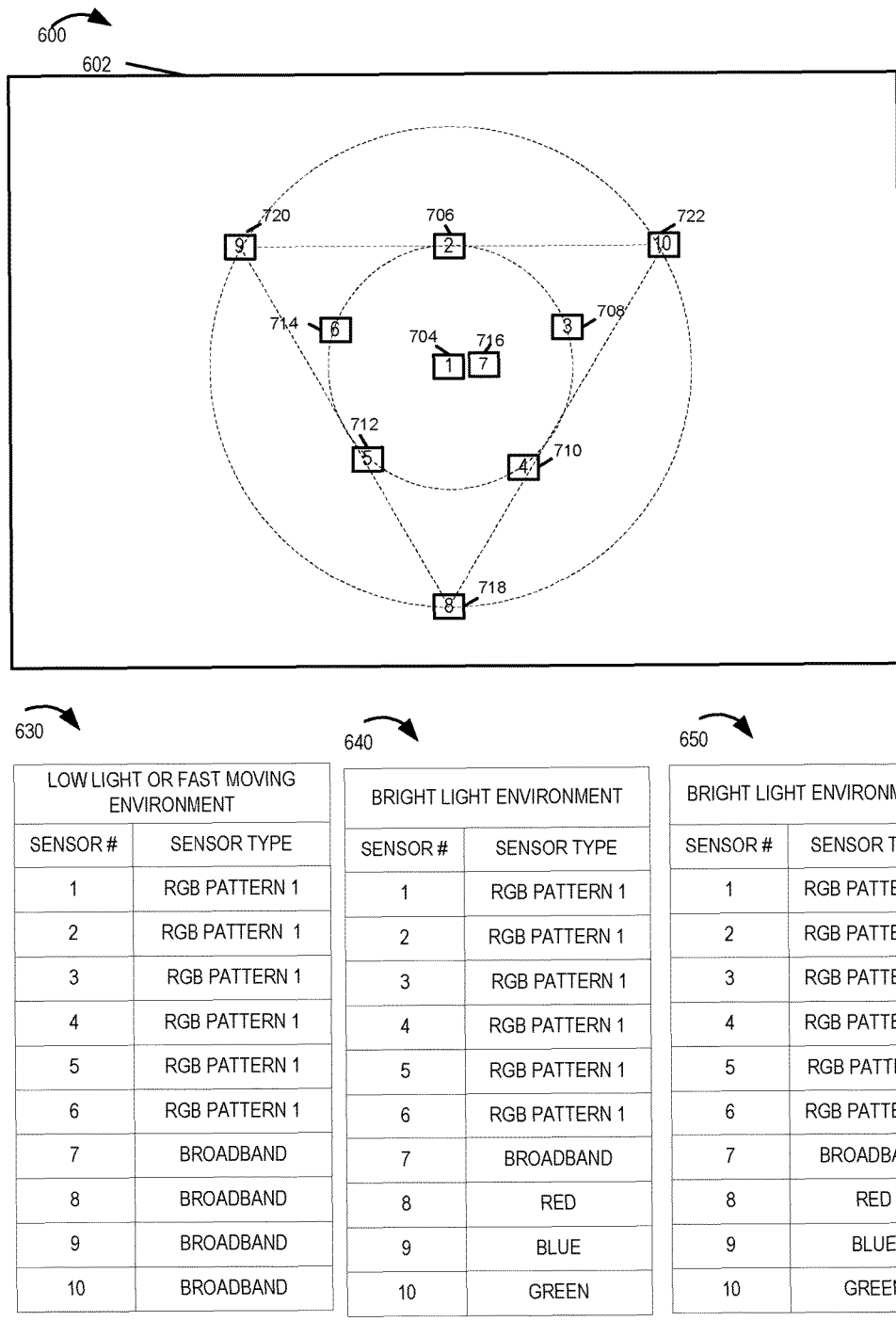
FIG. 6 includes an exemplary camera frame area, e.g., corresponding to the front of a camera device that includes exemplary sensors, in accordance with an exemplary embodiment.

FIG. 6 includes a drawing 600 of an exemplary camera face area 602, e.g., corresponding to the front of a camera device that includes exemplary sensors (sensor 1 704, sensor 2 706, sensor 3 708, sensor 4 710, sensor 5 712, sensor 6 714, sensor 7 716, sensor 8 718, sensor 9 720, sensor 10 722) in accordance with an exemplary embodiment. The camera device maybe and in some embodiments is the camera device 200 of FIG. 2 where N corresponds to the total number of optical chains and sensors. In some embodiments, each individual sensor covers approximately 2% of the full frame. Thus, in some embodiments, 20% of the full frame area corresponds to sensors. However, this is merely exemplary and the sensors may correspond to different portions or overall amounts of the available area.

In one exemplary embodiment, the set of sensors is represented by table 630 and, in another exemplary embodiment, the set of sensors is represented by table 640. Table 630, which corresponds to a set of sensors well suited to a low light or fast moving environment, identifies that sensor 1 through sensor 6 are standard RGB pattern type sensors and sensors 7-10 are broadband type sensors. Table 640, which corresponds to a set of sensors well suited to a bright light environment, identifies that sensor 1-6 are standard RGB pattern sensors, sensor 7 is a broadband type sensor, sensor 8 is a red sensor, sensor 9 is a blue sensor and sensor 10 is a green sensor. In some embodiment, for the exemplary broadband sensor type there is no filtering in the visible spectrum; however, there is filtering in the UV and IR spectrums, e.g., full filtering blocking out all or substantially all the UV and IR spectrum light.

In some exemplary embodiments, the set of sensors, which are used for a low light or fast moving environment, includes a plurality of standard RGB pattern sensors, and a plurality of broadband sensors. In some such embodiments with regard to the set of sensors, there are more standard RGB pattern sensors than there are broadband sensors. In some such embodiments, there is a standard RGB pattern sensor very close to a broadband sensor and both sensors are located in the vicinity of the center of the frame. In some such embodiments, there is a concentration of standard RGB pattern sensors near the center of the screen, and there is a concentration of broadband sensors located near the outside of the frame.

In some exemplary embodiments, the set of sensors, which are used for a bright light environment, includes a plurality of standard RGB pattern sensors, and a single broadband sensor, a single red sensor, a single blue sensor, and a single green sensor. In some such embodiments with regard to the set of sensors, there are more standard RGB pattern sensors than there are combined broadband, red, blue and green sensors. In some such embodiments, there is a standard RGB pattern sensor very close to a single broadband sensor and both sensors are located in the vicinity of the center of the frame. In some such embodiments, the red, blue and green sensors are located farther away from the center of the frame than the standard RGB pattern sensors.

In some embodiments, standard RGB pattern sensors are situated in a circle pattern, e.g., with one sensor at the approximate center of the circle and approximate center of the frame, and the other sensors situated along the circumference of the circle. In some embodiments, the sensor which are either broadband, red, green, or blue sensors, as situated in a triangle pattern, e.g., with one sensor at the approximate center of the triangle and approximate center of the frame, and the other sensors at the vertices of the triangle.

FIG. 5 includes table 500 describing 3 exemplary alternative standard RGB patterns, which may be used for the standard RGB pattern described in FIG. 6. RGB pattern 1, which is a Bayer pattern, allows 50% of the green light to get through, 25% of the red light to get through, and 25% of the blue light to get through. RGB pattern 2 allows 25% of the green light to get through, 50% of the red light to get through, and 25% of the blue light to get through. RGB pattern 3 allows 25% of the green light to get through, 25% of the red light to get through, and 50% of the blue light to get through.

FIG. 6 illustrates 3 different sensor configuration 630, 640, 650 which may be used, and in some embodiments are used, in the camera 600. In the third configuration 650 the camera device includes multiple sensors corresponding to different optical chains with different color filter patterns. By using the different RGB filter patterns with different sensors, the overall capture of color information can be made more uniform than using the standard Bayer pattern for all the sensors. Thus, when a composite image is generated from images captured by a camera using the third sensor configuration, the combining processes used to generate the composite image will have available to it a more even, in terms of amount, collection of information in the form of pixel values corresponding to different colors than if the same RGB configuration were used for all the sensors.

Figure 7:
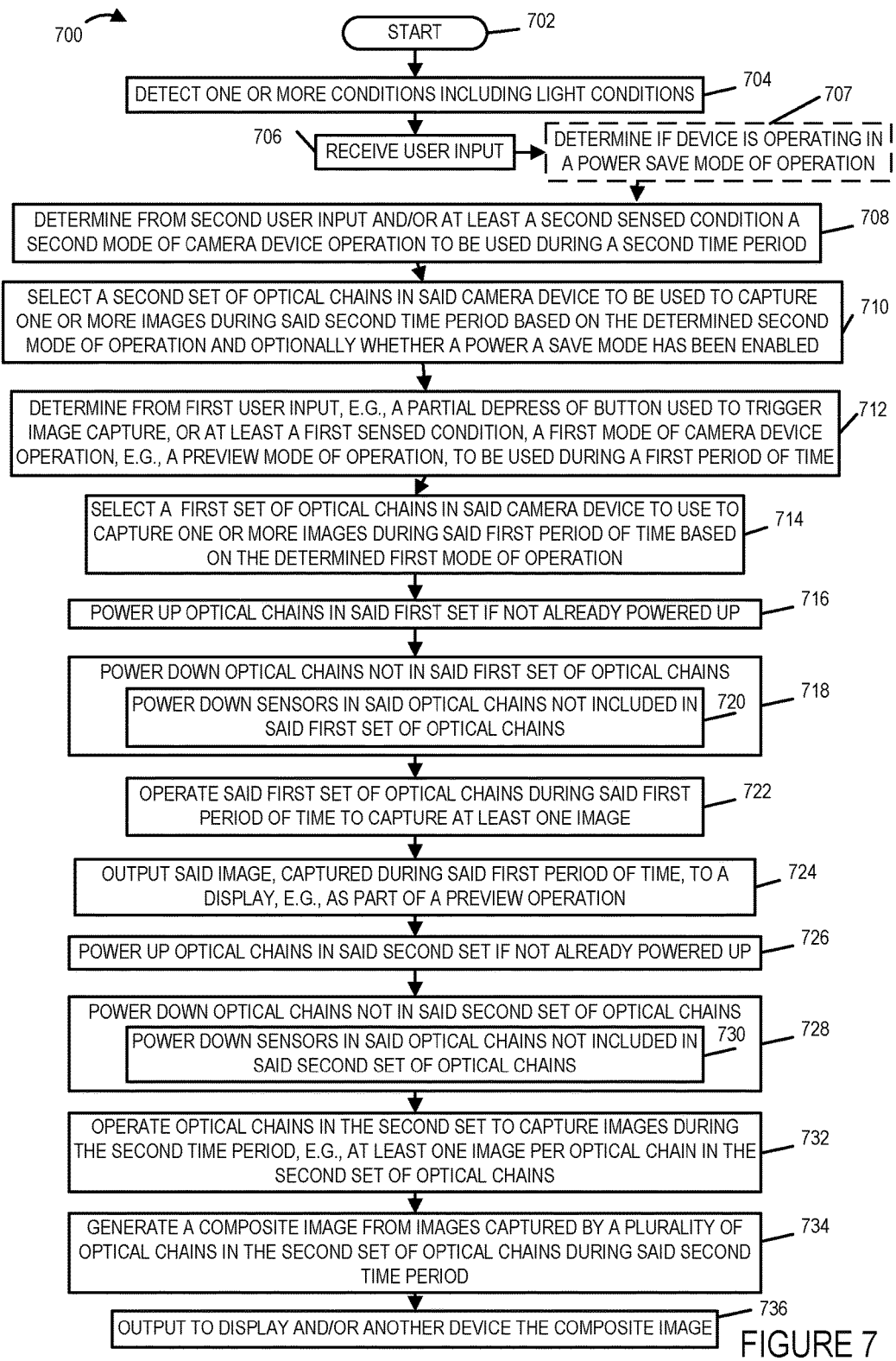
FIG. 7 is a flowchart of an exemplary method of operating a camera device in accordance with an exemplary embodiment.

FIG. 7 is a flowchart 700 of an exemplary method of operating a camera device in accordance with an exemplary embodiment. In some embodiments, the camera device implementing the method of flowchart 700 includes multiple optical chains, at least some of said multiple optical chains including sensors with multi-element filters, at least some optical chains including filters of a different type then another optical chain in said multiple optical chains. In various embodiments, the camera device implementing the method of flowchart 700 includes a first optical chain including a first filter having a first filter pattern including a first plurality of filter elements, at least some of said first plurality of filter elements corresponding to different colors, said first filter being part of a first sensor; and a second optical chain including a second filter having a second filter pattern including a second plurality of filter elements, said second plurality of filter elements including i) color filter elements of a first color in a different ratio to color filter elements of a second color than said first filter pattern or ii) a filter element of a type not included in said first filter pattern, said second filter being part of a second sensor which is implemented on a separate semiconductor from said first sensor. In some such embodiments, the camera device further includes a third optical chain including a third filter including a third plurality of filter elements corresponding to a third filter pattern which is different from said first and second filter patterns, said third plurality of filter elements being part of a third sensor implemented on a separate semiconductor from said first and second sensors.

In some embodiments, said first filter pattern has more green filter elements than red filter elements, and wherein said first filter pattern has more green filter elements than blue filter elements. In some such embodiments, said second filter pattern has more red filter elements than blue filter elements, and wherein said second filter pattern has more red filter elements than green filter elements. In some such embodiments, said third filter pattern has more blue filter elements than green filter elements, and said third filter pattern has more blue filter elements than red filter elements.

In some embodiments, the first filter pattern includes at least one red, one green and one blue filter element and said second filter pattern includes at least one red filter element, one green filter element, one blue filter element and one clear filter element. In some embodiments, the first filter pattern includes a repeating pattern including one red filter element, two green filter elements and one blue filter element. In some embodiments, one of said second and third filter patterns includes a repeating pattern including two filter elements corresponding to different colors and two clear filter elements.

In some embodiments, the camera device implementing the method of flowchart 700 includes a processor, e.g., a processor configured to perform the steps of the method. In various embodiments, the camera device implementing flowchart 700 of FIG. 7 includes a display.

Operation of the exemplary method starts in step 702 in which the camera device is powered on and initialized. Operation proceeds from step 702 to step 704.

In step 704 the camera device detects one or more conditions including light conditions, e.g., based on light detections sensor information. Other conditions include, e.g., a low battery energy level, a high stability level of the camera device, a low stability level of the camera device, e.g., indicating shaking of the camera device, an expected low light environment based on time of day information indicating night, etc. Operation proceeds from step 704 to step 706, in which the camera device receives user input. Exemplary received user input includes, e.g., an indication that a function button has been depressed, a switch has been set or moved, a point of a touch-screen menu has been touched, etc. In embodiments where a user selectable power save mode of operation is supported, the user input may also indicate that the power save mode is to be enabled/disabled. Thus the user input may indicate whether the camera device is to operate in a power save mode intended to conserve battery power or a normal mode of operation, e.g., in which image quality may be given priority over conservation of battery power. The power save feature can be particularly useful in cell phone camera device implementations where a user may be seeking to conserve battery power for cell phone calls but would still like to capture images albeit at potentially lower quality than could be used if more optical chains and thus more battery power was used to capture images in parallel. During battery save power mode of operation a reduced number of optical chains is used to capture images as compared with normal mode operation. For example color image capture may use half or less the number of optical chains to capture images in parallel when power save mode is enabled than when power save mode is not enabled. In some embodiments color image capture is performed with more than 4 camera modules during normal mode color image capture while in power save mode in one such embodiment one or two camera modules are used to capture color images. As should be appreciated the power save feature is particularly useful in cell phone or other embodiments which image capture may be important but less important than communication or another feature for which battery power is to be conserved. Battery power save mode in some embodiment is automatically activated when a sensor in the camera device detects a low battery condition, e.g., a voltage below a predetermined threshold used to trigger battery save mode operation.

Operation proceeds from step 706 to step 708 directly in embodiments where power save mode is not supported and via optional step 707 in embodiments where power save mode is supported by the camera device. In step 707 the processor and/or a control module or element of the camera device, e.g., mode determinator 317, detects based on user input and/or sensed battery status information, whether power save mode is to be considered enabled or disabled. In cases where multiple level of power save mode operation may be set by the user or automatically determined or set based on the battery power level, the detemintor may also determine the level of power save mode when power save mode is enabled, e.g., active. If the user or battery level indicates that power save mode is to be enabled, optical chain selection will be influenced to select a smaller set of optical chains for normal image capture than is selected when power save mode is not active. Thus, step 707 includes determining if the camera device is operating in a power save mode of operation or a normal mode of operation.

In step 708 the camera device determines from second user input and/or at least a second sensed condition a second mode of camera device operation, e.g., a normal color, mono or IR image capture mode of operation or some variation thereof, to be used during a second period of time. Operation proceeds from step 708 to step 710, in which the camera device selects a second set of optical chains in said camera device to be used to capture one or more images during said second period of time based on the determined second module of operation. In various embodiments, the selection of a second set of optical chains performed in step 710 is further based on the type of filter included in individual optical chains. In step 710 optical chains which capture pixel values which can be used to generate images of the type corresponding to the mode of operation will be selected.

In some embodiments step 710 involves selecting a set of optical chains based on whether the camera device is determined to be in a power save mode of operation or a normal mode of operation, said step of selecting a set of optical chains including selecting a first set of optical chains based on an image capture mode of operation to be used to capture images when it is determined that said camera device is operating in the power save mode of operation and a second set of optical chains based on the image capture mode of operation to be used to capture images when it is determined that said camera device is operating in a normal mode of operation, said first set of optical chains including fewer optical chains than said second set. The image capture mode of operation is, in some embodiments, one of a color image capture mode of operation, an IR image capture mode of operation or a monochrome image capture mode of operation. In some embodiments the first set of optical chains includes half or fewer optical chains than said second set of optical chains. In some cases, e.g., when the highest power save level is enabled, the first set of optical chains includes a single optical chain and the second set of optical chains includes at least four optical chains with the set including the single optical chain being selected when the highest power save mode of operation is activated.

See FIG. 9 for examples of sets of optical chains which may be selected for different modes of operation and the previous discussion with regard to the operation of the optical chain set selector 357. In selection step 710, whether power save mode is active or not is considered in embodiments where the power save feature is supported. When power save is active, a smaller set of optical chains will be selected in some embodiments in step 710 than when the power save mode is not active.

Operation proceeds from step 710 to step 712. In step 712 the camera device determines from first user input, e.g., a partial depress of a button used to trigger image capture, or at least a first sensed condition, a first mode of camera operation, e.g., a preview mode of camera operation, to be used during a first period of time. In various embodiments, the second mode of operation is different from the first mode of operation.

In some embodiments, the first mode of operation is one of a preview mode of operation, a color image capture mode of operation, an IR image capture mode of operation and a monochrome image capture mode of operation; and the second mode of operation is a different one the preview mode of operation, the color image capture mode of operation, the IR image capture mode of operation and the monochrome image capture mode of operation.

Operation proceeds from step 712 to step 714. In step 714 the camera device selects a first set of optical chains in said camera device to use to capture one or more images during the first period of time based on the determined first mode of operation. In various embodiments, the selection of a first set of optical chains performed in step 714 is further based on the type of filter included in individual optical chains. In various embodiments, the second set of optical chains is different from said first set of optical chains. In some embodiments, when the determined first mode of operation is a preview mode of operation, the first set of optical chains includes a single optical chain; and when the determined second mode of operation is a color capture mode of operation, the second set of optical chains includes a plurality of optical chains with R, G and B filter elements.

Operation proceeds from step 714 to step 716 in which the camera device powers up optical chains in said first set of optical chains that are not already powered up. Operation proceeds from step 716 to step 718.

In step 718 the camera device powers down optical chains not in said first set of optical chains. Step 718 includes step 720 in which the camera device powers down sensors in said optical chains not included in said first set of optical chains. Operation proceeds from step 718 to step 722.

In step 722 the camera device operates the first set of optical chains during the first period of time to capture at least one image. Operation proceeds from step 722 to step 724.

In step 724 the camera device outputs said image, captured during said first period of time, to a display, e.g., as part of a preview operation. In some embodiments, said first mode of operation is a preview mode of operation; the camera device includes a display, and in step 724 the camera devices outputs to said display an image captured by said single optical chain during said first period of time as part of a preview operation. Operation proceeds from step 724 to step 726.

In step 726 the camera device powers up optical chains in said second set of optical chains if not already powered up. Operation proceeds from step 726 to step 728.

In step 728 the camera device powers down optical chains not in said second set of optical chains. Step 728 includes step 730 in which the camera device powers down sensors in said optical chains not included in said second set of optical chains. Operation proceeds from step 728 to step 732. In step 732 the camera device operates optical chains in said second set of optical chains to capture images during the second time period, e.g., at least one image per optical chain in the second set of optical chains. Operation proceeds from step 732 to step 734.

In step 734 the camera device generates a composite image from images captured by a plurality of optical chains in the second set of optical chains during said second time period. Operation proceeds from step 734 to step 736. In step 736 the camera device outputs to a display included in the camera device and/or another device the generated composite image.

In some embodiments, when said first mode of operation is an IR mode of operation, the first set of optical chains includes only optical chains which include an IR filter element; and when the determined second mode of operation is a color mode of operation, the second set of optical chains includes a plurality of optical chains with R, G and B filter elements.

In some embodiments, the first mode of operation is a preview mode of operation; and said first set of said plurality of optical chains includes a first single one of said plurality of optical chains. In some such embodiments, said first filter pattern is a Bayer filter pattern.

In some embodiments, said camera device includes at least two optical chains with the first type color filter, two optical chains with the second type color filter and two optical chains with the third type color filter. In some such embodiments, the camera device includes at least one optical chain without a color filter. In some such embodiments, the camera device includes at least one optical chain with a red single color filter, one optical chain with a green single color filter and one optical chain with a blue single color filter.

In some embodiments, said first, second and third color filters are integrated into sensors of first, second and third optical chains respectively.

FIG. 8A includes a drawing 800 of an exemplary camera frame area 802, e.g., corresponding to the front of a camera device that includes exemplary sensors (sensor 1 804, sensor 2 806, sensor 3 808, sensor 4 810, sensor 5 812, sensor 6 814, sensor 7 816, sensor 8 818, sensor 9 820, sensor 10 822, sensor 11 824, sensor 12 826, sensor 13 828, sensor 14 830, sensor 15 832, sensor 6 834, sensor 17 836) in accordance with an exemplary embodiment. Each sensor shown in FIG. 8A corresponds to a different optical chain, e.g., camera module of the same camera device. Each sensor maybe and normally is implemented as a separate integrated circuit, also sometimes referred to as a sensor chip, since it is a sensor implemented on a semiconductor. The camera device may be and in some embodiments is the camera device 200 of FIG. 2 where N corresponds to the total number of optical chains and sensors. Depending on the embodiment multiple sensors may capture images covering the same field of view or different portions of a field of view. In some embodiments sensors 1, 7, 11, 12, 13 and 14 capture a entire field of view while the other sensors may correspond to optical chains which capture a portion of the field of view with the sensors outside the inner circle of FIG. 8A potentially having a larger focal length than the optical chains within the inner circle.

Depending on the optics and individual outer apertures different optical chains may have outer openings or lenses of different sizes and thus may correspond to or occupy different portions of the available area on the front of the camera.

FIG. 8B is a chart 850 showing the filter types of the sensors used in one embodiment of the camera device shown in FIG. 8A. Note that there is a one to one relationship between the sensor and optical chain with the corresponding number shown in FIG. 8A.

In the FIG. 8B example, there is an equal number of the three different types of RGB patterns. That is, sensors 1 and 4 of optical chains 1 and 4 use the first RGB pattern, sensors 2 and 5 corresponding to optical chains 2 and 5 use the second type of RGB pattern and sensors 3 and 6 used the third RGB pattern. Thus, when optical chains 1, 2, 3, 4, 5 and 6 are used in parallel, the set of optical chains 1 to 6, will capture, in combination, a set of R, G, B pixel values in equal amounts even though an individual sensor will capture more pixel values of one color than another.

In addition to sensors 1-6, the camera device of FIG. 8A further includes a broadband sensor corresponding to optical chain 7 which may be implemented using a clear filter over all the pixel sensor of sensor 7. In addition, the camera device includes optical chains with sensors with a red filter (sensor 8), a blue filter (sensor 9), a green filter (sensor 10). The optical chains with filters corresponding to a single sensor are useful in providing information about an individual color to which the sensor filter corresponds. A sensor for detecting IR light having an IR filter (sensor 11) is provided. Sensor 11 will detect IR signals and will not detect individual R, G, B colors or broad spectrum light.

Optical chains 12 and 13 include corresponding sensors 12 and 13 with RGCB filter patterns. Such sensors are well suited for capturing individual color information as well as overall luminance information.

Optical chains 14 and 15 include sensors with RGIRB patterns while optical chains 16 and 17 include sensors with RCCB patterns. When RCCB patterns are used green pixel values may be, and sometimes are, generated from a C pixel value and corresponding R and B pixel values.

In the FIG. 8A embodiment the camera device includes multiple sensors of each filter type which includes multiple different types of filter elements. For example two RCCB sensors and two RGIRB sensors. This allows for pixel values of the same type to be captured by different sensors and the pixel values corresponding to the same portion of a scene area and type of light to be combined. This allows for noise averaging.

Individual sensors having a filter corresponding to a single type of filter element are provided so that an entire field of view can be captured in a single color or IR. This information can be used in combining images captured by other optical chains and/or used to generate a composite image of the scene area from the images captured by each sensor corresponding to a single color or IR.

In the case of preview mode of operation, if a single sensor is dedicated to the color or type of light that has been selected for image generation purposes by the user, in some embodiments the single sensor with the filter corresponding to the selected type of light will be used. For example, if an image is to be captured using IR during an action or normal capture mode of operation, the preview image may be captured by IR sensor 11 and displayed without the need or use of the other optical chains or sensors. However during normal mode IR image capture operation where one or more sequential images are to be captured and persevered, all or multiple optical chains capable of capturing IR pixel values may be used with a composite image then being generated from the IR pixel values whether they are captured by the dedicated IR sensor 11 or combination sensors 14, 15.

In some embodiments optical chains and/or sensors of optical chains which capture pixel values which will not be used for final image generation purposes, e.g., production of a composite image corresponding to a user selected mode of operation, are powered down, i.e., off, during period of time other optical chains are used to capture images with pixel values useful to the user selected mode of operation.

In some embodiment a user first selects a desired color, IR, or monochrome mode of operation, e.g., by touching a screen control or pressing a control button. The user can then indicate a desire to operate in a preview mode, e.g., by partially depressing an image capture button or a preview mode control on a touch screen display of the camera device. The camera device will determine which set of optical chains to use during the preview mode of operation and display a corresponding preview image. In some embodiments the preview image is generated from an image captured by a single one of the sensors. During preview mode operation the other non-selected sensors may be, and sometimes are, powered down. Following the preview the user may press a button or control to enter the normal capture mode corresponding to the user selected color, IR or monochrome format. A different set of sensors, normally including multiple sensors of different optical chains is often used for the normal capture mode with some sensors still being intentionally powered down when they output of such sensors will not be used, e.g., in generating a composite image. Images captured by the set of selected sensors for the normal image capture mode are processed with pixel values from different sensors being combined as part of the process of generating a composite image which is then output to the display, stored and/or transmitted. Composite image generation may happen on the camera device or external to the camera device with the camera device providing the pixel values obtained as part of the image capture device to a computer or cloud processing device for use in generating a composite image.

FIG. 9 illustrates a chart 900 which shows for each of a first through sixth mode of operation, which set of optical chains and thus sensors may be used to capture images during a particular mode of operation. Note that depending on the embodiment and/or user setting which of the possible sets is used at a given time may vary with the one set normally being used for each of the listed modes of operation. While a camera module with a filter pattern of a single type corresponding to the selected normal mode of operation is often used for the corresponding preview mode, in camera devices without single optical chains corresponding to a single type of light, one of the optical chains which capture multiple types of light may be used, e.g., with the pixel values corresponding to the single type of light corresponding to a user selected mode of operation being used for image preview purposes. By using a single camera module to supply pixel values for preview purposes, computational resources and potentially the time needed to generate and display a preview image is reduced. In addition, since the other modules are powered down in some embodiments during preview mode, preview mode can be implemented using less power than embodiments where composite images are generated for preview purposes. While a single sensor is used in some embodiments for preview mode operation, the multiple sensors and camera modules are used to support preview mode in other embodiments.

In FIG. 9, each row of the chart 900 corresponds to a different mode of operation. For a color preview mode (mode 1), a single optical chains 1, 12, or 14 is sometimes used. In other embodiments another module may be used for the color preview mode.

For IR preview mode (mode 2) shown in row 2, IR sensor 11 or sensor 14 is used. Since sensor 11 is dedicated to IR it will provide more IR pixel values and is thus preference in some embodiments to sensor 11 in which only ¼ of the pixel values will be IR pixel values.

Row 3 corresponds to a mono preview mode of operation (mode 3). For mono preview mode sensor 7 with clear filter elements is used or sensor 12 with at least one clear filter element is used.

Operation modes 4, 5, and 6 are normal image capture modes in which multiple sensors are often used in combination to capture pixel values which can then be combined to generate a composite image The preview mode may be used prior to the normal image capture mode.

Mode 4 corresponds to a color image capture mode in which color images may be captured for a single image capture period or multiple sequential image capture periods in the case of view capture. Exemplary sets of optical chains which may be, and are used, in some embodiments for color image capture mode are shown corresponding to mode 4. One of the illustrated sets of sensors would be selected and used during a given color image capture time period. Sensors not included in the selected set may be, and sometimes are, powered down. The sets reflect possible user preferences for particular image or pixel value formats and/or different image compositing objectives with different combinations of pixel values offering different benefits depending on the way in which the pixel values are processed to generate the composite image.

Mode 5 is an IR image capture mode of operation. During the IR mode of operation sets of image sensors which include IR filter elements may be used. Exemplary sets of optical chains and thus sensors are shown in FIG. 9 for a camera device of the type to which FIGS. 8A and 8B relate.

The mono image capture mode of operation, mode 6, can be implemented using pixel values captured using clear filters or by combing various color pixel values together and/or with clear (luminance) pixel values. Accordingly a wide variety of different sets of sensors may be used for mono image capture with some exemplary sets shown in FIG. 9.

It should be appreciated that the sets of optical chains used for different modes of operation in FIG. 9 are purely exemplary and other sets or also possible. In addition, a camera device can be implemented with fewer or more camera modules than show in FIGS. 8A and 8B with the set of camera modules used for a particular camera taking advantage of the available modules.

In some embodiments a user may select, by pressing a button, a power save mode of operation. In such an embodiment the control module of the camera will chose to use a set of camera modules for color, IR and/or mono image capture mode which include fewer optical chains and camera modules than are used when the same mode of operation is selected but the power save mode is not enabled. Thus, during a given image capture mode of operation if the power save feature is enabled, fewer images will be captured per frame capture time period using fewer optical chains than when the user has not activated the power save mode of operation.

Thus, as part of the processes of selecting which set of optical chains to use during a particular mode of operation the control module, in some embodiments first checks to determine if the power save feature is active or not with different sets of modules being selected for the mode of operation based on whether or not power save is enabled.

Figure 10:
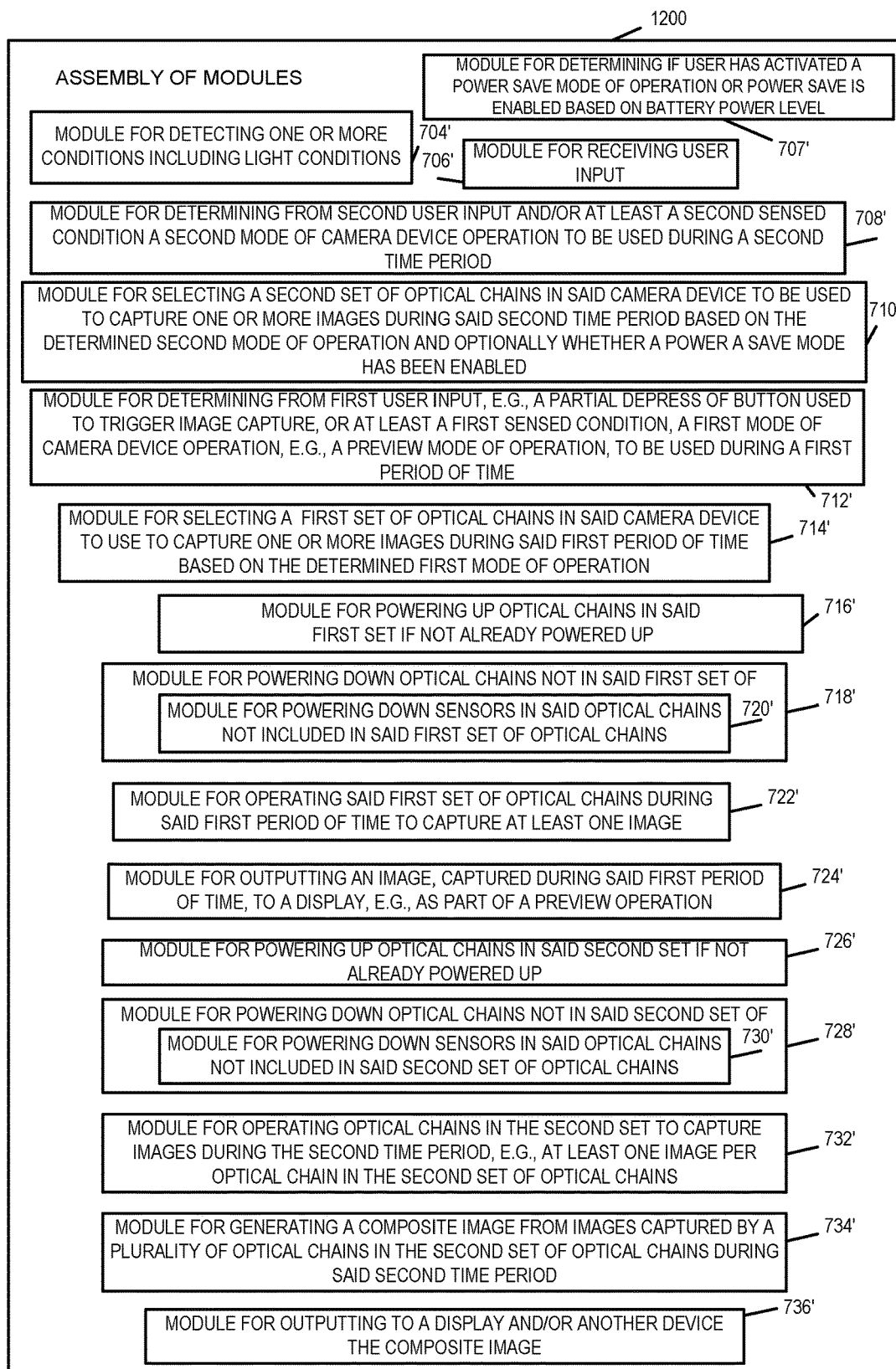
FIG. 10 shows an assembly of modules which may be implemented in hardware, e.g., as circuits, or as software and which can be used in camera device of FIGS. 1, 2, 3 or any of the other camera devices shown in the application.

FIG. 10 shows an assembly of modules 1200 which may be implemented in hardware, e.g., as circuits, or as software and which can be used in camera device of FIGS. 1, 2, 3 or any of the other camera devices shown in the application. The modules in FIG. 10 perform the operations of the corresponding numbered steps shown in FIG. 7 or control the processor of the camera device to control the camera device to implement the corresponding step of FIG. 7 with the modules of FIG. 10 including the number of the step of FIG. 7 with a ' after it to indicate that it is the corresponding module. For example module 704' implements step 704 while module 707' implements step 707. While for space step 707 does not discuss determining if power save is enabled based on battery power level it should be appreciated that the determination in step 707 can be, and in some embodiments is, based on user input and/or the detected battery power level. The modules shown in FIG. 10 may be implemented as routines and included in the assembly of modules 314 or implemented in hardware and included in the assembly of modules 306. In some embodiments all modules are implemented in hardware but in other embodiments some modules are implemented in software and other modules in hardware. In addition to the modules shown in FIG. 10, the assembly of modules may and in some embodiments do include a mode determinator 317, a battery power level detector 315 and an optical chain set selector 357 which can be the same as or similar to those described with regard to FIG. 3 with the elements being implemented in hardware, e.g., as circuits or as software.

In various embodiments the outer lens of the multiple optical chains are fixed and thus unlike many conventional zoom camera devices in such embodiments the outer lenses, i.e., the lenses on the face of the camera, do not move out of the camera body and are fixed with respect to the face of the camera even during zoom operations. The outermost lenses may, and in some embodiments do have zero or very little optical power and serve largely as a cover to keep dirt out of the optical chains to which the outer lens corresponds. The outer lens in such embodiments may be implemented using flat glass or plastic. In some embodiments a slideable cover is slide over the outer lenses when the camera is to be placed in storage and slide back when the camera device is to be used. In one such embodiment with the lenses being uncovered, the cover slide to a position in which the case which includes the lens cover can be used as a camera grip or handle.

In some embodiments while a portion of the outermost lens may extend from the front of the camera device beyond the surface of the camera device, the outermost lenses generally extend, if at all, a small amount which is less than the thickness of the camera. Thus even during use the lenses to not extend significantly beyond the face of the camera device in which the optical chains are mounted and normally less than half the thickness of the camera device at most.

In many if not all cases images representing real world objects and/or scenes which were captured by one or more of the optical chain modules of the camera device used to take the picture are preserved in digital form on a computer readable medium, e.g., RAM or other memory device and/or stored in the form of a printed image on paper or on another printable medium.

While explained in the context of still image capture, it should be appreciated that the camera device and optical chain modules of the present invention can be used to capture video as well. In some embodiments a video sequence is captured and the user can select an object in the video sequence, e.g., shown in a frame of a sequence, as a focus area, and then the camera device capture one or more images using the optical chain modules. The images may, and in some embodiments are, combined to generate one or more images, e.g., frames. A sequence of combined images, e.g., frames may and in some embodiments is generated, e.g., with some or all individual frames corresponding to multiple images captured at the same time but with different frames corresponding to images captured at different times.

Different optical chain modules may be and sometimes are controlled to use different exposure times in some embodiments to capture different amounts of light with the captured images being subsequently combined to produce an image with a greater dynamic range than might be achieved using a single exposure time, the same or similar effects can and in some embodiments is achieved through the use of different filters on different optical chains which have the same exposure time. For example, by using the same exposure time but different filters, the sensors of different optical chain modules will sense different amounts of light due to the different filters which allowing different amount of light to pass. In one such embodiment the exposure time of the optical chains is kept the same by at least some filters corresponding to different optical chain modules corresponding to the same color allow different amounts of light to pass. In non-color embodiments neutral filters of different darkness levels are used in front of sensors which are not color filtered. In some embodiments the switching to a mode in which filters of different darkness levels is achieved by a simple rotation or movement of a filter platter which moves the desired filters into place in one or more optical chain modules.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits to as modules alone or in combination with other hardware elements. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform one or more of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

What is claimed is:

1. A camera device, comprising:
   a first-type optical chain including a first filter having a first RGB (red, green, blue) filter pattern including more G filter elements than R or B filter elements, said first filter being part of a first sensor of a first type;

a second-type optical chain including a second filter having a second RGB filter pattern including more R filter elements than G filter elements;

a third-type optical chain including a third filter having a third RGB filter pattern including more B filter elements than G filter elements, wherein the second filter includes more R filter elements than B filter elements or the third filter includes more B filter elements than R filter elements; and a processor configured to:

determine a first mode of camera device operation to be used during a first period of time from first user input or at least a first sensed condition; and select a first set of optical chains in said camera device to use to capture one or more images during said first period of time based on the determined first mode of operation.

2. The camera device of claim 1, wherein the first mode of camera device operation is mower save mode of operation, and wherein the camera device is configured to automatically trigger a change to the power save mode of operation based on battery power falling; and wherein the camera device uses fewer optical chains during the power save mode of operation than during a normal mode of operation.

3. The camera device of claim 1, wherein the processor is further configured to:

determine a second mode of camera device operation to be used during a second period of time from second user input or at least a second sensed condition, said sensed second condition being a battery power condition; and select a second set of optical chains in said camera device to use to capture one or more images during said second period of time based on the determined second mode of operation, said second mode of operation being different from said first mode of operation, second set of optical chains being different from said first set of optical chains.

4. The camera device of claim 3, wherein said first mode of operation is a power save mode of operation, wherein said second mode of operation is a normal mode of operation, and wherein said first set of optical chains includes fewer optical chains than said second set of optical chains.

5. The camera device of claim 1 further comprising:

a fourth-type optical chain, said fourth-type optical chain being a broadband optical chain including a sensor and not including a color filter.

6. The camera device of claim 1 wherein the camera device includes a plurality of first-type optical chains.

7. The camera device of claim 6, wherein the camera device includes a plurality of said second-type optical chains.

8. The camera device of claim 7, wherein the camera device includes an equal number of first- and second-type optical chains.

9. The camera device of claim 7, wherein the camera device includes a plurality of third-type optical chains.

10. The camera device of claim 8, wherein the camera device includes an equal number of first-, second-, and third-type optical chains.

11. The camera device of claim 1, wherein the camera device includes five optical chains positioned along a circle, said five optical chains including two first-type optical chains, two second-type optical chains, and one third-type optical chain.

12. The camera device of claim 11, wherein the camera device further includes a broadband optical chain, which does not include a color filter, said broadband optical chain being positioned in a center portion of said circle.

13. The camera device of claim 12, further comprising:

a second third-type optical chain positioned in the center portion of said circle.

14. The camera device of claim 13, further including:

a fifth-type optical chain including a red filter and not including a green or blue filter;

a sixth-type optical chain including a blue filter and not including a red or green filter; and a seventh-type optical chain including a green filter and not including a blue or red filter.

* * * * *